US012451057B2

(12) United States Patent
Lee et al.

(10) Patent No.: US 12,451,057 B2
(45) Date of Patent: Oct. 21, 2025

(54) PIXEL CIRCUIT AND DISPLAY APPARATUS HAVING THE SAME

(71) Applicant: Samsung Display Co., Ltd., Yongin-Si (KR)

(72) Inventors: Jiyoung Lee, Yongin-si (KR); Sohae Kim, Yongin-si (KR); Jisong Chae, Yongin-si (KR); Sang-Gu Lee, Yongin-si (KR); Yongwoo Lee, Yongin-si (KR); Hyung Uk Cho, Yongin-si (KR); Hyunyoung Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/754,149

(22) Filed: Jun. 26, 2024

(65) Prior Publication Data

US 2025/0014509 A1 Jan. 9, 2025

(30) Foreign Application Priority Data

Jul. 5, 2023 (KR) ........................ 10-2023-0086824

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0852* (2013.01); *G09G 2310/08* (2013.01)

(58) Field of Classification Search
CPC ... G09G 3/32–3291; G09G 2300/0852; G09G 2310/08
See application file for complete search history.

(56) References Cited

U.S. PATENT DOCUMENTS

| | | | | |
|---|---|---|---|---|
| 7,561,124 | B2 | 7/2009 | Kwak et al. | |
| 10,388,214 | B2 * | 8/2019 | Na | G09G 3/3233 |
| 10,665,169 | B2 * | 5/2020 | Chang | G09G 3/3266 |
| 10,777,131 | B2 * | 9/2020 | Kim | G09G 3/3258 |
| 10,916,218 | B2 * | 2/2021 | Kim | G09G 3/3233 |

(Continued)

FOREIGN PATENT DOCUMENTS

KR 10-0686334 B1 2/2007

*Primary Examiner* — Gene W Lee
(74) *Attorney, Agent, or Firm* — Innovation Counsel LLP

(57) ABSTRACT

A pixel circuit includes a first transistor including a control electrode connected to a second node, a first electrode receiving a first power supply voltage, and a second electrode connected to a third node, a second transistor including a control electrode receiving a write signal, a first electrode connected to a data line, and a second electrode connected to a first node, a third transistor including a control electrode receiving a compensation signal, a first electrode connected to the second node, and a second electrode connected to the third node, a fourth transistor including a control electrode receiving an initialization signal, a first electrode receiving an initialization voltage, and a second electrode connected to a fourth node, a fifth transistor including a control electrode connected to the first node, a first electrode connected to the third node, and a second electrode connected to the fourth node, and a light emit element including a first electrode connected to the fourth node.

20 Claims, 27 Drawing Sheets

(56) References Cited

U.S. PATENT DOCUMENTS

| | | | | |
|---|---|---|---|---|
| 10,957,249 | B2 * | 3/2021 | Lee | G09G 3/3233 |
| 11,562,687 | B2 * | 1/2023 | Park | G09G 3/32 |
| 11,636,805 | B2 * | 4/2023 | Jang | H10K 59/131 345/690 |
| 11,893,943 | B2 * | 2/2024 | Chen | G09G 3/3266 |
| 11,900,861 | B2 * | 2/2024 | Kim | G09G 3/32 |
| 11,915,637 | B2 * | 2/2024 | Ju | G09G 3/3258 |
| 12,125,425 | B2 * | 10/2024 | Park | G09G 3/3233 |
| 12,154,510 | B2 * | 11/2024 | Chen | H10D 86/441 |
| 12,178,078 | B2 * | 12/2024 | Kang | H10K 59/1216 |
| 2022/0270542 | A1 * | 8/2022 | Park | G09G 3/3233 |
| 2022/0392382 | A1 * | 12/2022 | Park | G09G 3/20 |
| 2023/0075763 | A1 * | 3/2023 | Kim | H10D 86/60 |
| 2023/0099387 | A1 * | 3/2023 | Park | G09G 3/32 |
| 2023/0145269 | A1 * | 5/2023 | Oh | G09G 3/20 345/690 |

* cited by examiner

PIXEL CIRCUIT AND DISPLAY APPARATUS HAVING THE SAME

CROSS-REFERENCE TO RELATED APPLICATION

This application claims priority, under 35 USC § 119, to Korean Patent Application No. 10-2023-0086824 filed on Jul. 5, 2023 in the Korean Intellectual Property Office KIPO, the contents of which are herein incorporated by reference in their entireties.

BACKGROUND

1. Field

The present inventive concept relates to a display apparatus. More particularly, embodiments of the present inventive concept relates to an pixel circuit and a display apparatus including the pixel circuit.

2. Description of the Related Art

In general, a display apparatus may include a display panel and a display panel driver. The display panel may include a plurality of gate lines, a plurality of data lines, a plurality of emission lines, and a plurality of pixels. The display panel driver may include a gate driver configured to provide gate signals to the gate lines, a data driver configured to provide data voltages to the data lines, an emission driver configured to provide emission signals to the emission lines, and a driving controller configured to control the gate driver, the data driver, and the emission driver.

A conventional pixel circuit may include seven or more transistors, Thus, it may be difficult to apply the conventional pixel circuit to an ultra-high resolution display apparatus due to limitations of integration.

SUMMARY

Embodiments of the present inventive concept provide a pixel circuit with a small number of transistors.

Embodiments of the present inventive concept also provide a display apparatus including the pixel circuit.

In an embodiment according to the present inventive concept, a pixel circuit includes a first transistor including a control electrode connected to a second node, a first electrode configured to receive a first power supply voltage, and a second electrode connected to a third node, a second transistor including a control electrode configured to receive a write signal, a first electrode connected to a data line, and a second electrode connected to a first node, a third transistor including a control electrode configured to receive a compensation signal, a first electrode connected to the second node, and a second electrode connected to the third node, a fourth transistor including a control electrode configured to receive an initialization signal, a first electrode configured to receive an initialization voltage, and a second electrode connected to a fourth node, a fifth transistor including a control electrode connected to the first node, a first electrode connected to the third node, and a second electrode connected to the fourth node and a light emit element including a first electrode connected to the fourth node, and a second electrode configured to receive a second power supply voltage.

In an embodiment, the pixel circuit may further comprise a first capacitor including a first electrode configured to receive the first power supply voltage and a second electrode connected to the second node, a second capacitor including a first electrode connected to the first node and a second electrode connected to the second node and a third capacitor including a first electrode connected to the control node of the fourth transistor and a second electrode connected to the second node.

In an embodiment, a frame period of the pixel circuit may comprise a first period in which the initialization signal is inactive, the compensation signal is inactive, and the write signal is active, a second period in which the initialization signal changes from inactive to active, the compensation signal is inactive, and the write signal is active, a third period in which the initialization signal is active, the compensation signal is active, and the write signal is active, a fourth period in which the initialization signal changes from active to inactive, the compensation signal is inactive, and the write signal is active, and a fifth period in which the initialization signal is inactive, the compensation signal is inactive, and the write signal is inactive.

In an embodiment, in the first period, the second transistor may be in a turned-on state in response to the write signal, a reference voltage of the data line may be applied to the control node of the fifth transistor, and a voltage of the second node may be initialized.

In an embodiment, in the second period, the fourth transistor may be in a turned-on state in response to the initialization signal, the initialization voltage may be applied to the fourth node, the fifth transistor may be in a turn-off state, and the first transistor is in a turned-on state in response to a coupling operation of the third capacitor.

In an embodiment, in the third period, the third transistor may be in a turned-on state in response to the compensation signal, and a threshold voltage of the first transistor may be stored between the first electrode of the first capacitor and the second electrode of the first capacitor.

In an embodiment, in the fourth period, the third transistor may be in a turned-off state in response to an inactive state of the compensation signal, the second transistor may transmit the data voltage of the data line to the first node in response to an active state of the write signal, and the data voltage of the first node may be applied to the second node in response to a coupling operation of the second capacitor.

In an embodiment, in the fifth period, the second transistor may be in a turned-off state in response to the compensation signal, and the fifth transistor may be turned on based on a voltage of the first node.

In an embodiment, a frame period of the pixel circuit may comprise a first period in which the initialization signal is active, the compensation signal is inactive, and the write signal is inactive, a second period in which the initialization signal is active, the compensation signal is inactive, and the write signal is active, a third period in which the initialization signal is active, the compensation signal is active, and the write signal is active, a fourth period in which the initialization signal is inactive, the compensation signal is inactive, and the write signal is active and a fifth period in which the initialization signal is inactive, the compensation signal is inactive, and the write signal is inactive.

In an embodiment, a frame period of the pixel circuit may comprise a first period in which the initialization signal is inactive, the compensation signal is inactive, and the write signal is active, a second period in which the initialization signal changes from inactive to active, the compensation signal is inactive, and the write signal is active, a third period in which the initialization signal is active, the compensation signal is inactive, and the write signal is inactive, a fourth period in which the initialization signal is active, the compensation signal is active, and the write signal is inactive, a fifth period in which the initialization signal changes from active to inactive, the compensation signal is inactive, and the write signal changes from inactive to active and a sixth period in which the initialization signal is inactive, the compensation signal is inactive, and the write signal is inactive.

In an embodiment, the initialization voltage may be the second power supply voltage.

In an embodiment, the pixel circuit may further comprise a first capacitor including a first electrode configured to receive the first power supply voltage, and a second electrode connected to the second node, a second capacitor including a first electrode connected to the first node, and a second electrode connected to the second node and a third capacitor including a first electrode configured to receive the compensation signal, and a second electrode connected to the second node.

In an embodiment, the pixel circuit may further comprise a first capacitor including a first electrode configured to receive the first power supply voltage, and a second electrode connected to the second node, a second capacitor including a first electrode connected to the first node, and a second electrode connected to the second node, a third capacitor including a first electrode connected to the control electrode of the fourth transistor, and a second electrode connected to the second node, a fourth capacitor including a first electrode connected to the control electrode of the third transistor, and a second electrode connected to the second node, a fifth capacitor including a first electrode configured to receive the first power supply voltage, and a second electrode connected to the first node, a sixth capacitor including a first electrode connected to the fourth node, and a second electrode connected to the control electrode of the second transistor. The initialization signal may be a next stage write signal of a next stage.

In an embodiment, a frame period of the pixel circuit may comprise a first period in which the write signal changes from inactive to active, the next stage write signal is inactive, and the compensation signal is inactive, a second period in which the write signal is active, the next stage write signal is inactive, and the compensation signal is inactive, a third period in which the write signal changes from active to inactive, the next stage write signal changes from inactive to active, and the compensation signal is inactive, a fourth period in which the write signal changes from inactive to active, the next stage write signal changes from active to inactive, and the compensation signal changes from inactive to active, a fifth period in which the write signal is active, the next stage write signal is inactive, and the compensation signal is active, a sixth period in which the write signal is active, the next stage write signal changes from inactive to active, and the compensation signal changes from active to inactive, a seventh period in which the write signal is active, the next stage write signal is active, and the compensation signal is inactive, an eighth period in which the write signal changes from active to inactive, the next stage write signal is active, and the compensation signal is inactive, a ninth period in which the write signal is inactive, the next stage write signal changes from active to inactive, and the compensation signal is inactive, and a tenth period in which the write signal is inactive, the next stage write signal is inactive, and the compensation signal is inactive.

In an embodiment, in the ninth period, the third transistor is in a turned-off state in response to the compensation signal, a coupling voltage may be applied to the second node in response to the coupling operation of the third capacitor, and a voltage of the second node may have a final compensation voltage.

In an embodiment, in the tenth period, a data voltage of the data line may be applied to the control electrode of the fifth transistor, and the data voltage is lower than a sum of the first power supply voltage and the threshold voltage of the fifth transistor, so that the fifth transistor may be in a turned-on state.

In an embodiment, a frame period of the pixel circuit may comprise a first period in which the write signal changes from inactive to active, the next stage write signal is inactive, and the compensation signal is inactive, a second period in which the write signal is active, the next stage write signal is inactive, and the compensation signal is inactive, a third period in which the write signal changes from active to inactive, the next stage write signal changes from inactive to active, and the compensation signal is inactive, a fourth period in which the write signal changes from inactive to active, the next stage write signal changes from active to inactive, and the compensation signal changes from inactive to active, a fifth period in which the write signal is active, the next stage write signal is inactive, and the compensation signal is active, a sixth period in which the write signal changes from active to inactive, the next stage write signal changes from inactive to active, and the compensation signal changes from active to inactive, a seventh period in which the write signal is inactive, the next stage write signal changes from active to inactive, and the compensation signal is inactive, and an eighth period in which the write signal is inactive, the next stage write signal is inactive, and the compensation signal is inactive.

In an embodiment according to the present inventive concept, a display apparatus may include a display panel, a gate driver and a data driver. The display panel may include a pixel circuit. The gate driver may apply a write signal, a compensation signal and an initialization signal to the pixel circuit. The data driver may apply a data voltage or a reference voltage to the pixel circuit. The pixel circuit may comprise a first transistor including a control electrode connected to a second node, a first electrode configured to receive a first power supply voltage, and a second electrode connected to a third node, a second transistor including a control electrode configured to receive a write signal, a first electrode connected to a data line, and a second electrode connected to a first node, a third transistor including a control electrode configured to receive a compensation signal, a first electrode connected to the second node, and a second electrode connected to the third node, a fourth transistor including a control electrode configured to receive an initialization signal, a first electrode configured to receive an initialization voltage, and a second electrode connected to a fourth node, a fifth transistor including a control electrode connected to the first node, a first electrode connected to the third node, and a second electrode connected to the fourth node and a light emit element including a first electrode connected to the fourth node, and a second electrode configured to receive a second power supply voltage.

In an embodiment, the pixel circuit may further comprise a first capacitor including a first electrode configured to receive the first power supply voltage and a second electrode connected to the second node, a second capacitor including a first electrode connected to the first node and a second electrode connected to the second node and a third capacitor including a first electrode connected to the control node of the fourth transistor and a second electrode connected to the second node.

In an embodiment, a frame period of the pixel circuit may comprise a first period in which the initialization signal is inactive, the compensation signal is inactive, and the write signal is active, a second period in which the initialization signal changes from inactive to active, the compensation signal is inactive, and the write signal is active, a third period in which the initialization signal is active, the compensation signal is active, and the write signal is active, a fourth period in which the initialization signal changes from active to inactive, the compensation signal is inactive, and the write signal is active, and a fifth period in which the initialization signal is inactive, the compensation signal is inactive, and the write signal is inactive.

As described above, the pixel circuit according to embodiments may include five transistors and three capacitors. The pixel circuit may perform internal compensation and may have a relatively small number of transistors compared to conventional pixel circuits, thereby achieving high integration. Accordingly, the pixel circuit may be applicable to an ultra-high resolution display apparatus.

Additionally, the display apparatus including the pixel circuit may not use an emission driver, which may be advantageous for cost reduction and high-resolution design.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
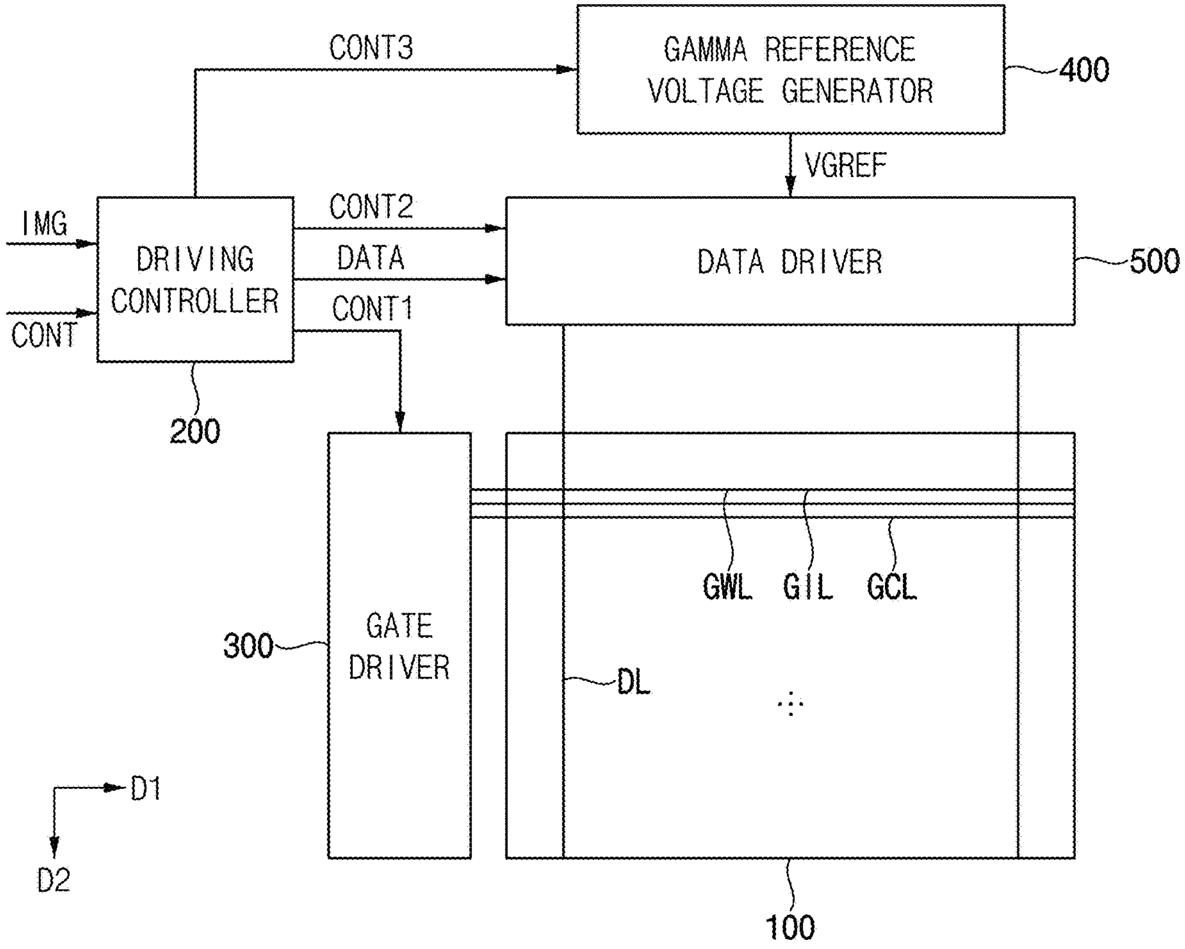
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus may include a display panel 100 and a display panel driver. The display panel driver may include a driving controller 200, a gate driver 300, a gamma reference voltage generator 400 and a data driver 500.

The display panel 100 may include a display part configured to display an image, and a peripheral part that is adjacent to the display part.

The display panel 100 may include a plurality of gate lines GWL, GIL, GCL, a plurality of data lines DL, and a plurality of pixel circuit electrically connected to the gate lines GWL, GIL, GCL and the data lines DL, respectively. For example, each pixel circuit of the display panel 100 may include one of the pixel circuit 600 shown in FIG. 2, the pixel circuit 700 shown in FIG. 12, the pixel circuit 800 shown in FIG. 13 and the pixel circuit 900 shown in FIG. 14. The gate lines GWL, GIL, GCL may extend in a first direction D1, and the data lines DL may extend in a second direction D2 crossing the first direction D1.

The driving controller 200 may receive an input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3 and a data signal DATA based on the input image data IMG and the input control signal CONT.

The driving controller 200 may generate the gate control signal CONT1 for controlling an operation of the gate driver 300 based on the input control signal CONT to output the generated gate control signal CONT1 to the gate driver 300. The gate control signal CONT1 may include a vertical start signal and a gate clock signal.

The driving controller 200 may generate the data control signal CONT2 for controlling an operation of the data driver 500 based on the input control signal CONT to output the generated data control signal CONT2 to the data driver 500. The data control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the gamma control signal CONT3 for controlling an operation of the gamma reference voltage generator 400 based on the input control signal CONT to output the generated gamma control signal CONT3 to the gamma reference voltage generator 400.

The gate driver 300 may generate gate signals for driving the gate lines GWL, GIL, GCL in response to the gate control signal CONT1 received from the driving controller 200. The gate driver 300 may output the gate signals to the gate lines GWL, GIL, GCL. For example, the gate driver 300 may sequentially output the gate signals to the gate lines GWL, GIL, GCL. The gate signals may include initialization signal GI, compensation signal GC and write signal GW.

For example, the gate driver 300 may be mounted on the peripheral region of the display panel. For example, the gate driver 300 may be integrated on the peripheral region of the display panel.

The gamma reference voltage generator 400 may generate a gamma reference voltage VGREF in response to the gamma control signal CONT3 received from the driving controller 200. The gamma reference voltage generator 400 may provide the gamma reference voltage VGREF to the data driver 500.

In an embodiment, the gamma reference voltage generator 400 may be disposed in the driving controller 200, or in the data driver 500.

The data driver 500 may receive the data control signal CONT2 and the data signal DATA from the driving controller 200, and receive the gamma reference voltage VGREF from the gamma reference voltage generator 400. The data driver 500 may convert the data signal DATA into an analog data voltage by using the gamma reference voltage VGREF. The data driver 500 may output the data voltages to the data lines DL. Additionally, the data driver 500 may output the reference voltage VREF or the data voltage VDATA to the data line DL in at least part of the frame period.

For example, the data driver 500 may be mounted on the peripheral region of the display panel. For example, the data driver 500 may be integrated on the peripheral region of the display panel.

Although FIG. 1 illustrates the gate driver 300 disposed on a first side of the display panel, the present inventive concept is not limited thereto. For example, the gate driver 300 may be disposed on a second side, which is different from the first side of the display panel 100.

Figure 2:
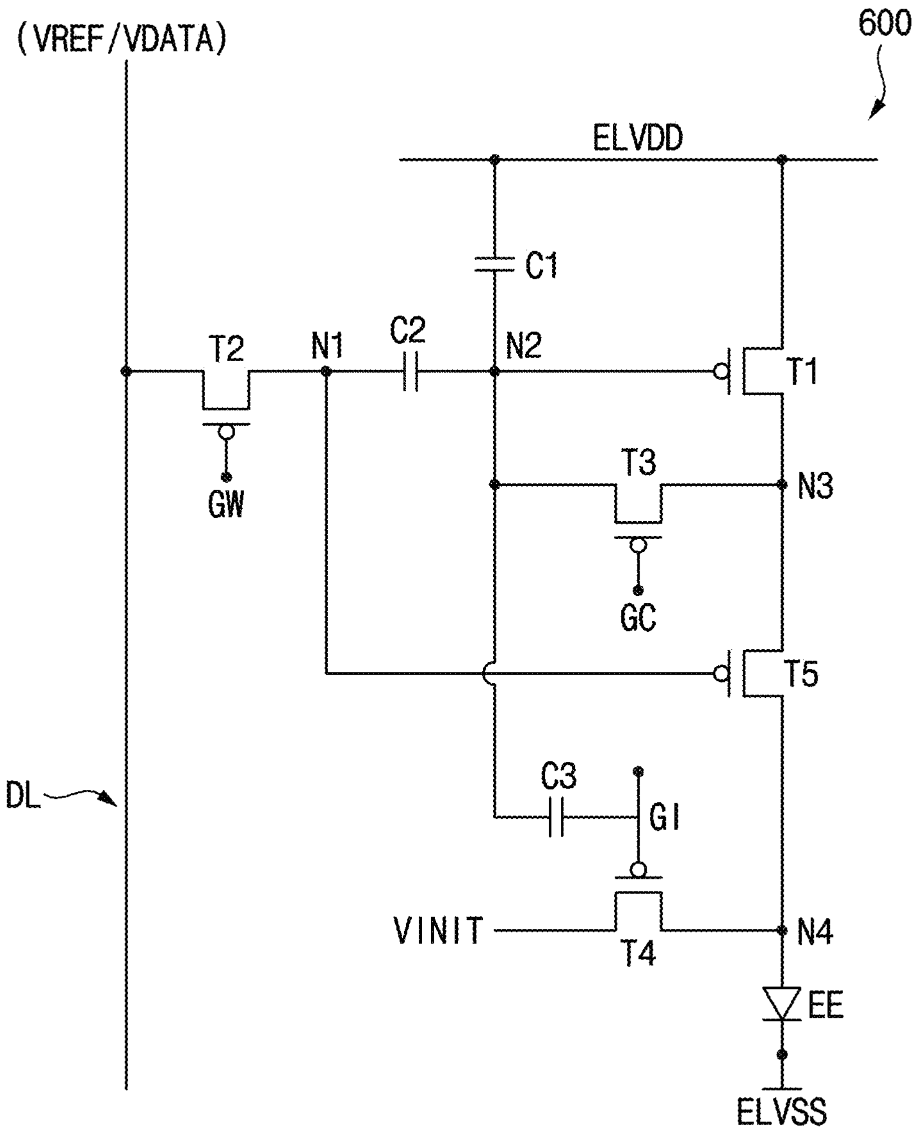
FIG. 2 is a circuit diagram illustrating a pixel circuit according to an embodiment of the present inventive concept.

FIG. 2 is a circuit diagram illustrating a pixel circuit according to an embodiment of the present inventive concept.

Referring to FIG. 2, the pixel circuit 600 may include a first transistor T1, a second transistor T2, a third transistor T3, a fourth transistor T4, a fifth transistor T5, and a light emitting element EE. In one embodiment, the pixel circuit 600 may further include a first capacitor C1, a second capacitor C2, and a third capacitor C3.

The first transistor T1 may generate a driving current based on the voltage of a second node N2. For example, the first transistor T1 may be called a driving transistor for generating the driving current. In one embodiment, the first transistor T1 includes a control electrode connected to the second node N2, a first electrode configured to receive the first power supply voltage ELVDD (for example, a high-power supply voltage), and a second electrode connected to a third node N3.

The second transistor T2 may transmit the data voltage VDATA (or the reference voltage VREF) of the data line DL to a first node N1 in response to the write signal GW. For example, the second transistor T2 may be called write transistor for transmitting the data voltage VDATA to the pixel circuit 600. In one embodiment, the second transistor T2 may include a control electrode configured to receive the write signal GW, a first electrode connected to the data line DL, and a second electrode connected to the first node N1. The third transistor T3 may diode-connect the first transistor T1 in response to the compensation signal GC. For example, the third transistor T3 may be called a compensation transistor for compensating a threshold voltage of the first transistor T1. In one embodiment, the third transistor T3 may include a control electrode configured to receive the compensation signal GC, a first electrode connected to the second node N2, and a second electrode connected to the third node N3.

The fourth transistor T4 may transmit an initialization voltage VINIT to a fourth node N4 (or an anode of the light emitting element EE) in response to the initialization signal GI. For example, the fourth transistor T4 may be called an initial transistor for initializing the anode of the light emitting element EE. In one embodiment, the fourth transistor T4 may include a control electrode configured to receive the initialization signal GI, a first electrode configured to receive the initialization voltage VINIT, and a second electrode connected to a fourth node N4.

The fifth transistor T5 may selectively connect the first transistor T1 to the light emitting element EE in response to the voltage of the first node N1. For example, the fifth transistor T5 may be called an emission transistor that selectively generates the driving current path. In one embodiment, the fifth transistor T5 may include a control electrode connected to the first node N1, a first electrode connected to the third node N3, and a second electrode connected to the fourth node N4.

The light emitting element EE may emit light based on the driving current generated by the first transistor T1. In one embodiment, the light emitting element EE may be an organic light emitting diode (OLED), but is not limited thereto. In other embodiments, the light emitting element EE may be a nano light emitting diode (NED), a quantum dot (QD) light emitting diode, a micro light emitting diode, an inorganic light emitting diode, or any other suitable light emitting device. Additionally, in one embodiment, the light emitting element EE may include a first electrode (for example, the anode) connected to the fourth node N4, and a second electrode (for example, a cathode) configured to receive a second power supply voltage (ELVSS) (for example, a low power supply voltage).

As described above, the control electrode of the fifth transistor T5 (or light emitting transistor) configured to receive the voltage of the first node N1 rather than an emission signal. Accordingly, the display apparatus including the pixel circuit 600 may not use an emission driver for generating the emission signal, which may be advantageous for cost reduction and high-resolution design.

The first capacitor C1 may be connected between a line of the first power supply voltage ELVDD and the second node N2. The first capacitor C1 may serve to maintain the voltage of the second node N2, that is, the voltage of the control electrode of the first transistor T1. In one embodiment, the first capacitor C1 may include a first electrode configured to receive the first power supply voltage ELVDD, and a second electrode connected to the second node N2.

The second capacitor C2 may be connected between the first node N1 and the second node N2. The second capacitor C2 may serve to transmit the data voltage VDATA applied to the first node N1 to the second node N2. In one embodiment, the second capacitor C2 may include a first electrode connected to the first node N1 and a second electrode connected to the second node N2.

The third capacitor C3 may be connected between the control electrode of the fourth transistor T4 and the second node N2. The third capacitor C3 may control the voltage of the second node N2, that is, the voltage of the control electrode of the first transistor T1, in response to the initialization signal GI. In one embodiment, the third capacitor C3 may include a first electrode connected to the control electrode of the fourth transistor T4, that is, the first electrode configured to receive the initialization signal GI, and a second electrode connected to the second node N2.

As such, the pixel circuit 600 may have a 5T3C structure including five transistors T1, T2, T3, T4, T5 and three capacitors C1, C2, C3.

Figure 3:
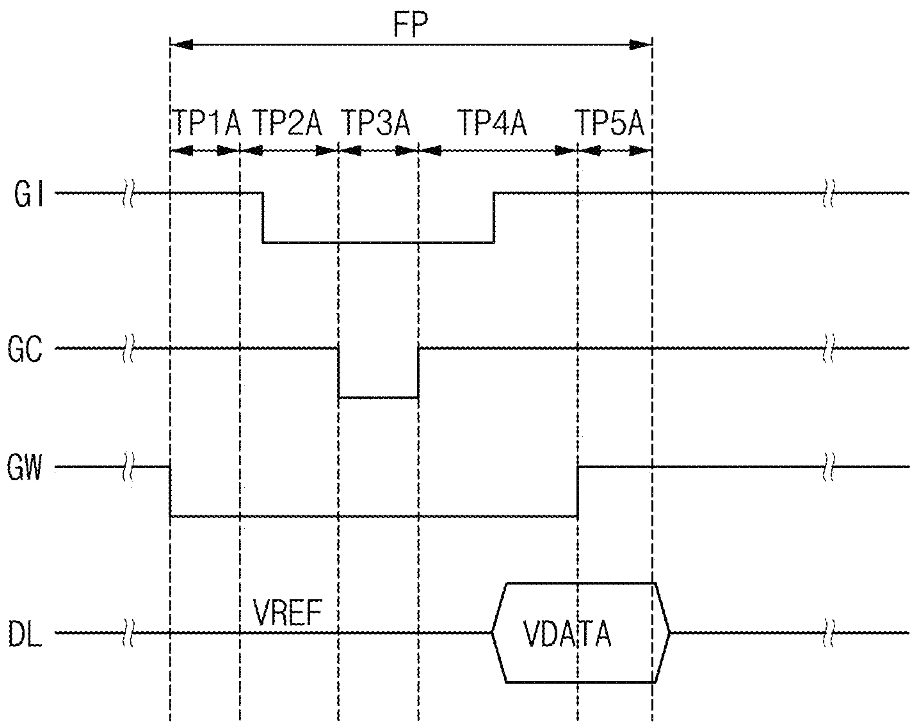
FIG. 3 is a timing diagram illustrating an example of an input signals applied to the pixel circuit of FIG. 2.
Figure 4:
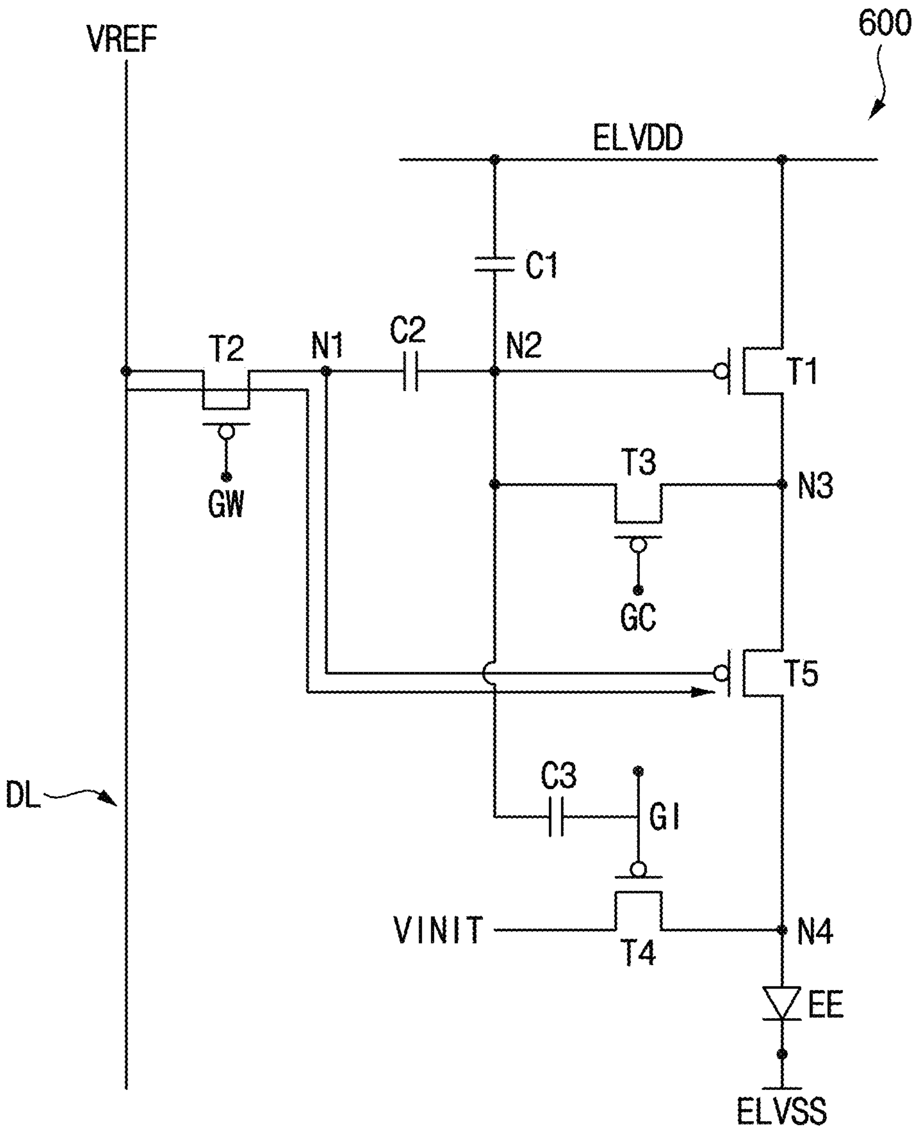
FIG. 4 is a circuit diagram for describing the operation of the pixel circuit of FIG. 2 in a first period.
Figure 5:
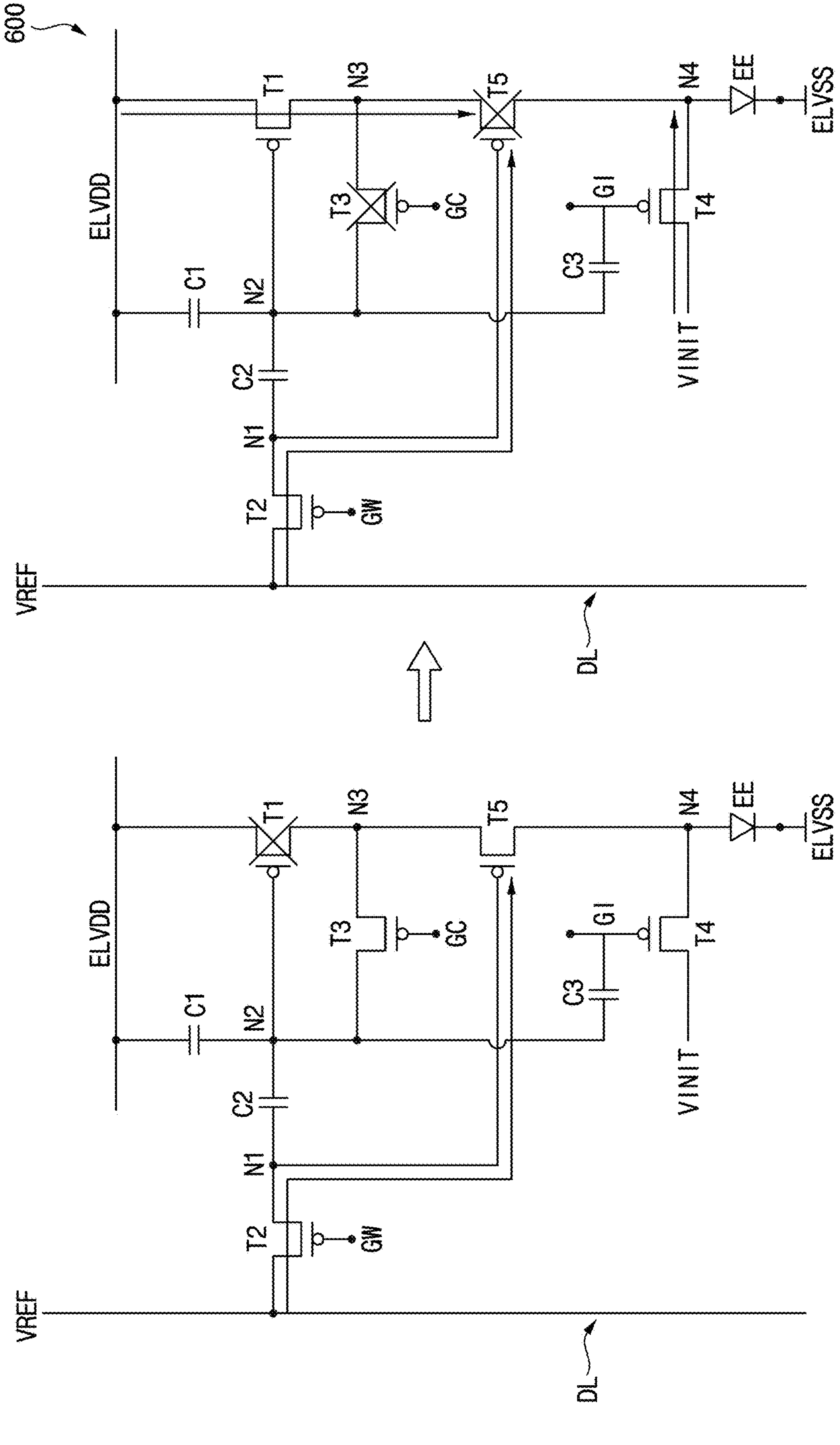
FIG. 5 is a circuit diagram for describing the operation in a second period of the pixel circuit of FIG. 2 in which the first transistor has turn-off state in the first period.
Figure 6:
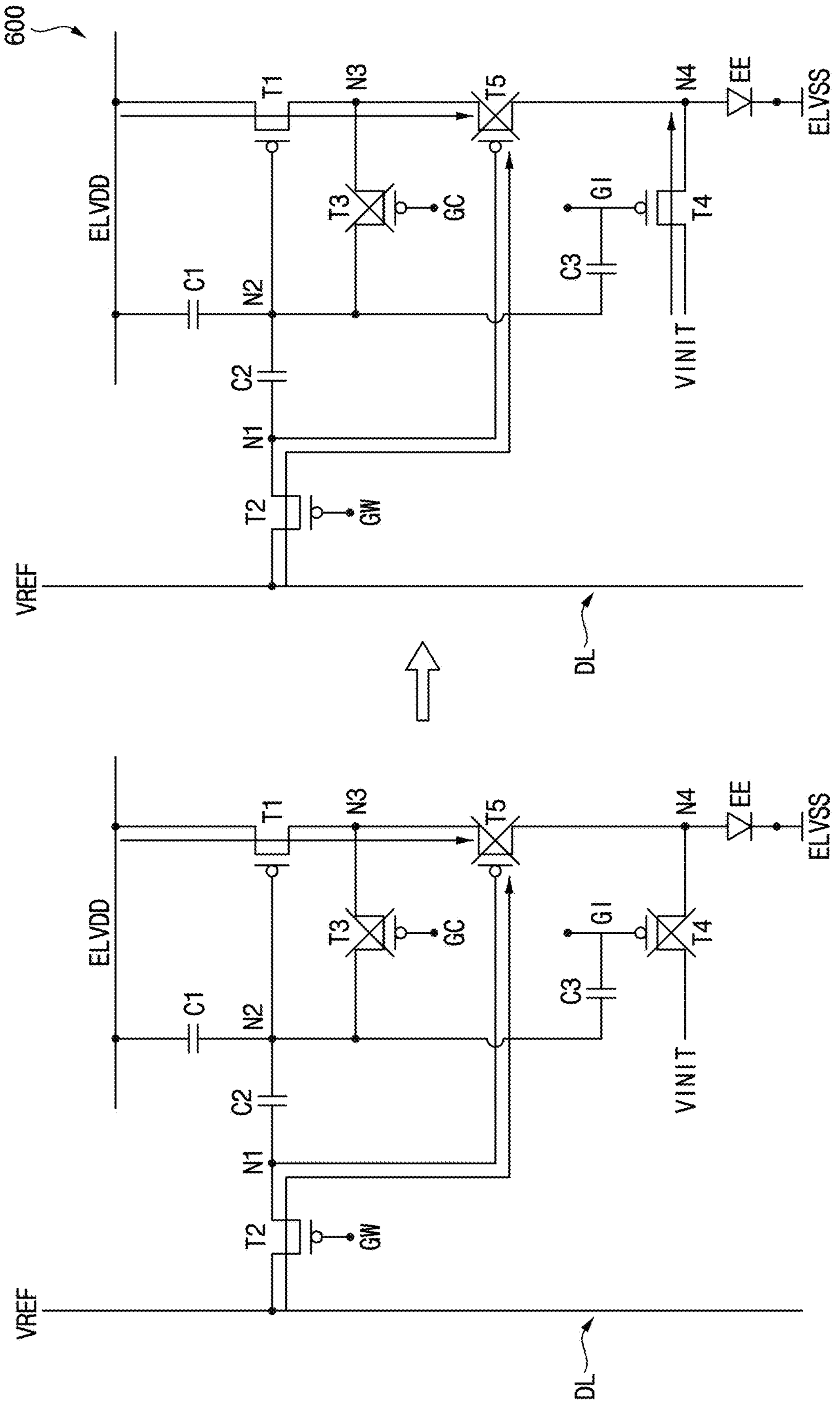
FIG. 6 is a circuit diagram for describing the operation in a second period of the pixel circuit of FIG. 2 in which the first transistor has turn-on state in the first period.
Figure 7:
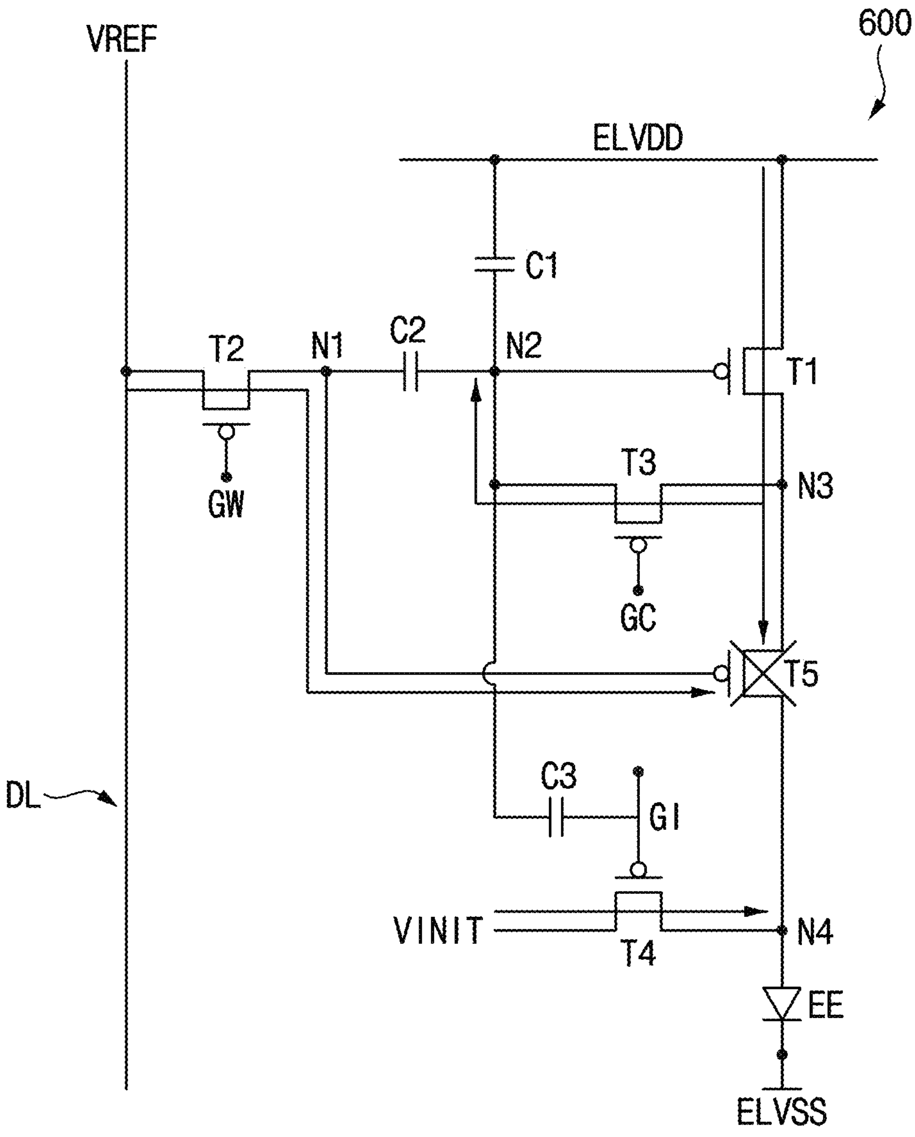
FIG. 7 is a circuit diagram for describing the operation of the pixel circuit of FIG. 2 in a third period.
Figure 8:
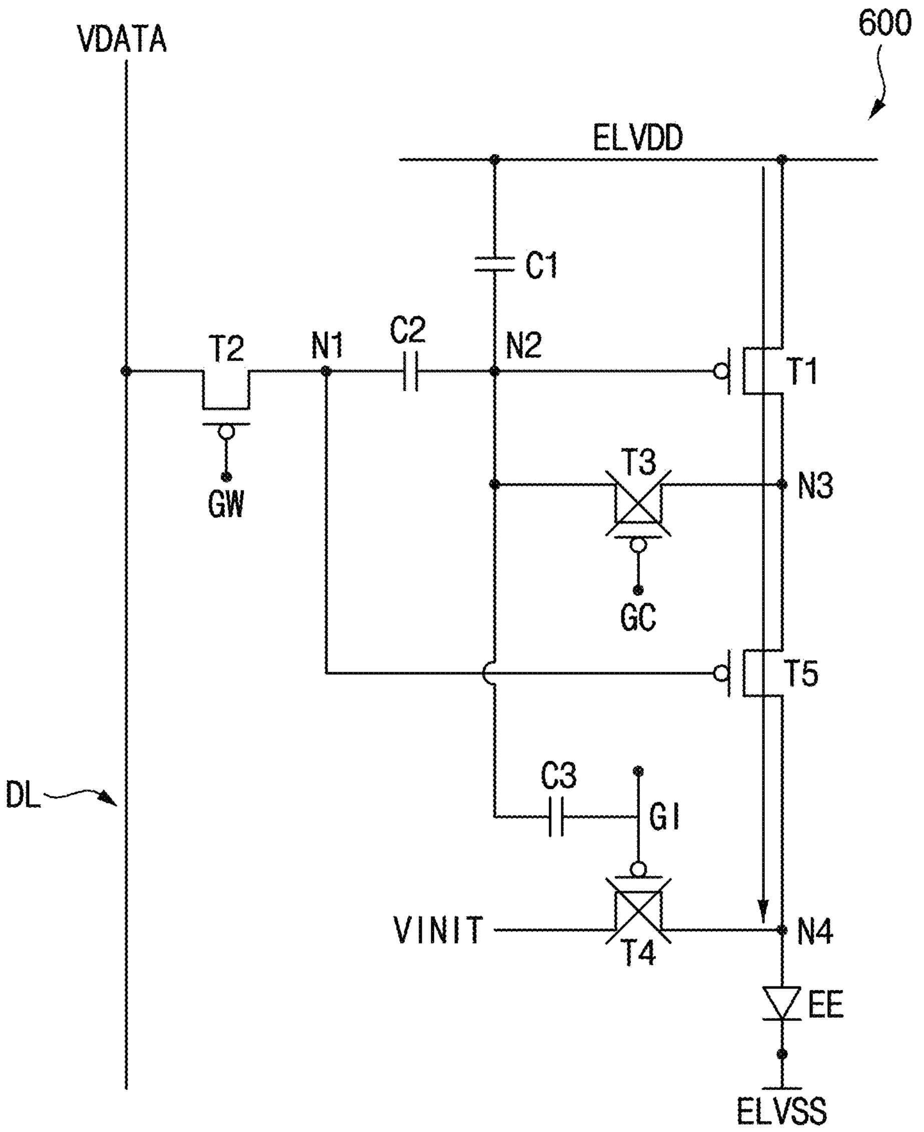
FIG. 8 is a circuit diagram for describing the operation of the pixel circuit of FIG. 2 in a fourth period.
Figure 9:
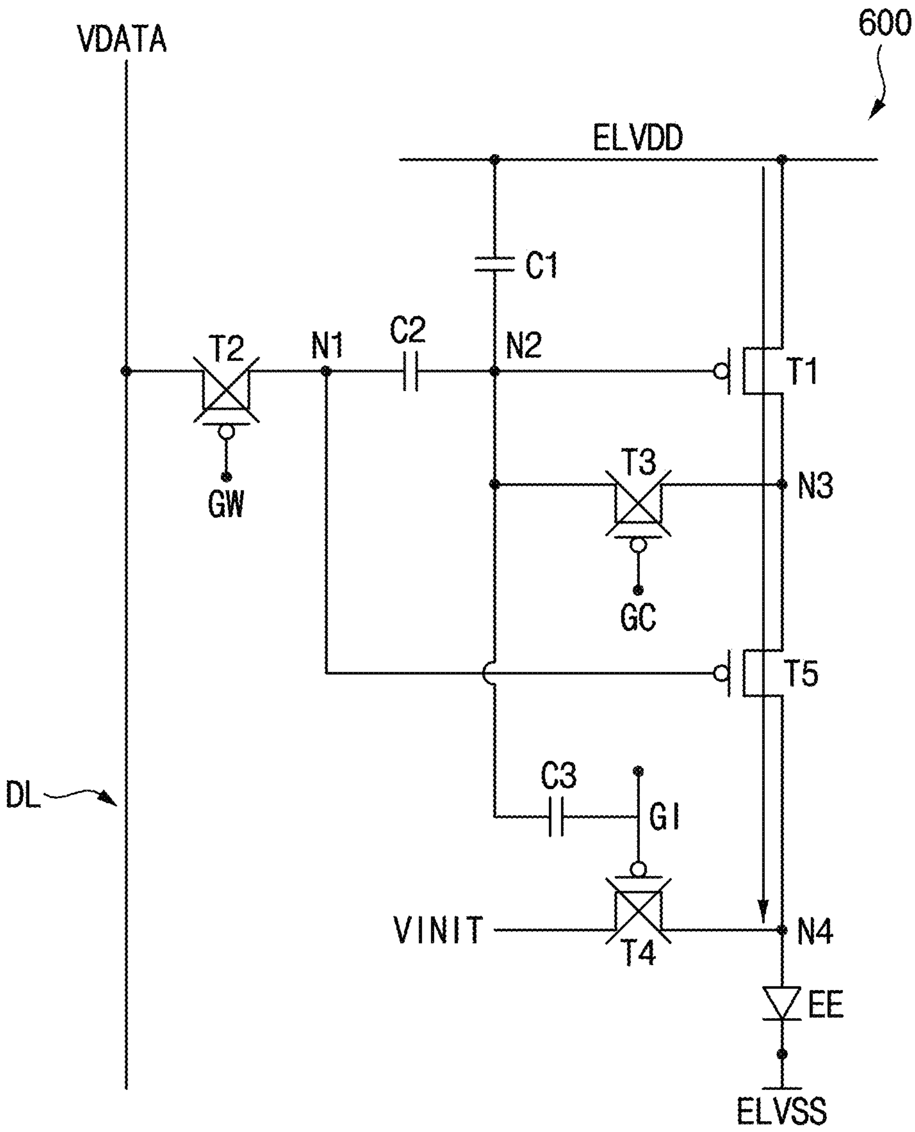
FIG. 9 is a circuit diagram for describing the operation of the pixel circuit of FIG. 2 in a fifth period.

FIG. 3 is a timing diagram illustrating an example of an input signals applied to the pixel circuit of FIG. 2. FIG. 4 is a circuit diagram for describing the operation of the pixel circuit of FIG. 2 in a first period. FIG. 5 is a circuit diagram for describing the operation in a second period of the pixel circuit of FIG. 2 in which the first transistor has turn-off state in the first period. FIG. 6 is a circuit diagram for describing the operation in a second period of the pixel circuit of FIG. 2 in which the first transistor has turn-on state in the first period. FIG. 7 is a circuit diagram for describing the operation of the pixel circuit of FIG. 2 in a third period. FIG. 8 is a circuit diagram for describing the operation of the pixel circuit of FIG. 2 in a fourth period. FIG. 9 is a circuit diagram for describing the operation of the pixel circuit of FIG. 2 in a fifth period.

Referring to FIG. 2 and FIG. 3, the frame period FP of the pixel circuit 600 may include a first period (TP1A), a second period (TP2A), a third period (TP3A), a fourth period (TP4A), and a fifth period (TP5A). In one embodiment, the first period (TP1A) is the first initialization period, the second period (TP2A) is the second initialization period, the third period (TP3A) is the first compensation period, and the fourth period (TP4A) is the second compensation period, and the fifth period TP5A may be the light emission period.

Referring to FIG. 3 and FIG. 4, in the first period TP1A, the initialization signal is inactive, the compensation signal is inactive, and the write signal is active. In one embodiment, as shown in FIG. 2, the pixel circuit 600 may include P-type transistors T1 to T5. Accordingly, an activation level of the initialization signal GI, compensation signal GC, and write signal GW may be a low level, and an inactivation level may be a high level, but are not limited thereto. In another embodiment, the pixel circuit 600 may include N-type transistors T1 to T5, an activation level of the initialization signal GI, compensation signal GC, and write signal GW may be the high level, and an inactivation level may be the low level. As used herein, a signal being "active" means the signal level is at an activation level, and a signal being "inactive" means the signal level is not at activation level.

In the first period TP1A, the reference voltage VREF may be applied to the data line DL, and the second transistor T2 may be turned on in response to the write signal GW being active. Accordingly, the second transistor T2 may apply the reference voltage VREF to the first node N1, and the reference voltage VREF may be applied to the control electrode of the fifth transistor T5.

When the first transistor T1 is turned-off in the first period TP1A, a voltage of the second node N2 may be higher than a sum of the first power supply voltage ELVDD and the threshold voltage VTH. In this case, a voltage difference between the voltage of the first electrode (e.g., source) of the first transistor T1 and a voltage of the control electrode of the first transistor T1 is higher than a threshold voltage VTH of the first transistor T1.

In addition, when the third transistor T3 is turned-off, that is, a voltage difference between a voltage of the first electrode (e.g., source) of the third transistor T3 and a voltage of the control electrode of the third transistor T3 is higher than a threshold voltage VTH of the first transistor T3. In this case, the voltage of the second node N2 may be lower than a voltage obtained by subtracting the threshold voltage VTH of the third transistor T3 from the high level of the compensation signal GC. For example, when the high level of the compensation signal GC is about 8V and the threshold voltage VTH of the third transistor T3 is about −0.6V, the voltage of the second node (N2) may be lower than about 8.6V.

In contrast, when the third transistor T3 is turned-on, that is, a voltage difference between a voltage of the first electrode (e.g., source) of the third transistor T3 and a voltage of the control electrode of the third transistor T3 is lower than the threshold voltage VTH of the first transistor T3, the voltage of the second node N2 may be higher than a voltage obtained by subtracting the threshold voltage VTH of the third transistor T3 from the high level of the compensation signal GC. Since the third transistor T3 may have a turn-on state, the voltage of the second node N2 and the voltage of the third node N3 may be the same.

Accordingly, a voltage difference between a voltage of the first electrode (e.g., source) of the fifth transistor T5 and the reference voltage VREF, which is the voltage applied to the control electrode of the fifth transistor T5, may be lower than a threshold voltage VTH of the fifth transistor T5. In this case, the fifth transistor T5 may be turned on. For example, the voltage of the second node N2 is higher than about 8.6V, the reference voltage VREF is about 8V, and the threshold voltage VTH of the fifth transistor T5 is about −0.6V. In this case, as the third transistor T3 may be turned on, the voltage of the third node N3 may become equal to the voltage of the second node N2, and the fifth transistor T5 may be turned on. As the fifth transistor may be turned on, the voltage of the second node N2, the voltage of the third node N3, and the voltage of the fourth node N4 may become equal. If the voltage difference between the voltage of the second electrode (e.g., source) of the fourth transistor T4 and the high level of the initialization signal GI applied to the control electrode of the fourth transistor T4 is lower than a threshold voltage of the fourth transistor T4, the fourth transistor T4 may have a turned-on state. For example, if the voltage of the second node N2 is higher than about 8.6V, the high level of the initialization signal GI is about 8V, and the threshold voltage of the fourth transistor T4 is about −0.6V, the fourth transistor may be turned on. Accordingly, the initialization voltage VINIT may be applied to the second node N2.

In contrast, when the first transistor T1 has turn-on state in the first period TP1A, the voltage of the second node N2 may lower than a sum of the first power supply voltage ELVDD and the threshold voltage of the first transistor T1.

That is, in the first period TP1A, regardless of whether the first transistor T1 has turn-off state or turn-on state, and whether the third transistor T3 has turn-off state or turn-on state, the voltage of the second node N2 may be initialized below a certain voltage. For example, the voltage of the second node N2 may be initialized to a voltage lower than or equal to a voltage obtained by subtracting the threshold voltage of the third transistor T3 from the high level of the compensation signal GC.

Referring to FIG. 3 and FIG. 5 to FIG. 6, in the second period TP2A, the initialization signal GI may change from inactive to active, the compensation signal GC may be inactive, and the write signal may be active.

Referring to FIG. 5, when the first transistor T1 is in a turned-off state, the initialization signal may have the low level. Since the initialization signal may have the low level, the fourth transistor T4 may be turned on. Accordingly, the voltage of the fourth node N4 may be maintained at the initialization voltage VINIT.

Since the initialization voltage VINIT may be applied to the control electrode of the fifth transistor T5 and the voltage of the fourth node N4 may have the initialization voltage VINIT, the fifth transistor T5 may be turned off.

The third capacitor C3 may couple the voltage change of the initialization signal GI and may apply it to the second node N2. Accordingly, the first transistor T1 may be turned on in response to the voltage of the second node N2. For example, when the voltage of the second node N2 in the first period is about 8.6V, the threshold voltage of the first transistor T1 is about −0.6V, and the low level of the initialization signal GW is about −8V, the high level of the initialization signal GW is about 8V, and a ratio of a capacitance of the first capacitor C1, a capacitance of the second capacitor C2, and a capacitance of third capacitor C3 is 1.5:6:2.5, the voltage applied by the third capacitor C3 by coupling the change in the initialization signal GI may be about −4V, and therefore the voltage of the second node N2 may be about 4.6V.

Since the voltage of the second node N2 may decrease, a voltage obtained by subtracting the voltage of the first electrode of the third transistor T3 from the voltage of the control electrode of the third transistor T3 may be higher than the threshold voltage of the third transistor. Accordingly, the third transistor T3 may be turned off.

Referring to FIG. 6, when the first transistor T1 is in a turned-on state, the initialization signal GI may be active. Accordingly, the fourth transistor T4 may be turned-on. Accordingly, the fourth node N4 may be initialized to the initialization voltage VINIT.

The reference voltage VREF may be applied to the control electrode of the fifth transistor T5 and the voltage of the third node N3 may have the first power supply voltage ELVDD. Therefore, a voltage obtained by subtracting the voltage of the first electrode (for example, source) of the fifth transistor T5 from the voltage of the control electrode of the fifth transistor T5 may be higher than the threshold voltage of the fifth transistor T5. Accordingly, the fifth transistor T5 may be turned-off. For example, when the reference voltage may be about 8V, the threshold voltage of the fifth transistor T5 may be about −0.6V and the first power supply voltage ELVDD may be about 7V, the fifth transistor may be turned-off because of 8V−7V>−0.6V.

The third capacitor C3 may couple a voltage change of the initialization signal GI and may apply it to the second node N2. Accordingly, the first transistor T1 may be maintained in a turned-on state in response to the voltage of the second node N2. For example, when the voltage of the second node N2 in the first period TP1A is about −4V, the threshold voltage of the first transistor T1 is about −0.6V, and the low level of the initialization signal GI is about-8V, the high level of the initialization signal GI is about 8V, and the capacitance ratio of the first capacitor C1, the second capacitor C2, and the third capacitor C3 is 1.5:6:2.5, the voltage applied by the third capacitor C3 by coupling the change in the initialization signal GI may be about −4V, and therefore the voltage of the second node N2 may be about −8V.

Referring to FIG. 3 and FIG. 7, in the third period TP3A, the initialization signal GI may be active, the compensation signal GC may be active, and the write signal GW may be active.

Referring to FIG. 7, in the third period TP3A, the third transistor T3 may diode-connect the first transistor T1 in response to the compensation signal GC. Accordingly, the voltage of the second node N2 may be a sum of the first power supply voltage and the threshold voltage of the first transistor T1 due to the diode-connected first transistor T1. In addition, since the first electrode of the first capacitor C1 may be applied the first power supply voltage and the voltage of the second electrode of the first capacitor C1 may be the voltage of the second node N2, the threshold voltage of the first transistor T1 may be stored between the first electrode of the first capacitor C1 and the second electrode of the first capacitor C1. The voltage of the second node N2 may be a sum of the first power supply voltage ELVDD and the threshold voltage of the first transistor T1. The operation of storing the threshold voltage of the first transistor T1 between the first electrode of the first capacitor C1 and the second electrode of the first capacitor C1 may herein be referred to as a "compensation operation."

Referring to FIG. 3 and FIG. 8, in the fourth period TP4A, the initialization signal GI may change from active to inactive, the compensation signal GC may be inactive, and the write signal GW may be active.

Referring to FIG. 8, the third transistor T3 may be turned off in response to an inactive state of the compensation signal GC. Since the initialization signal GI may change from active to inactive, the fourth transistor T4 may be turned off.

In the fourth period TP4A, the voltage of the first node N1 may be the data voltage VDATA and the voltage of the second node N2 may be a final compensation voltage. For example, the final compensation voltage may be ELVDD+VTH+C2/(C1+C2+C3)*(VDATA)−C2/(C1+C2+C3)*(VREF)+C3/(C1+C2+C3)*(VGH−VGL). C1 refers to the capacitance of the first capacitor C1, C2 refers to the capacitance of the second capacitor C2, and C3 refers to the capacitance of the third capacitor C3. Additionally, VGL refers to the low level voltage of the initialization signal GI, and VGH refers to the high level voltage of the initialization signal GI. Accordingly, the voltage of the second node N2 may be the final compensation voltage.

Referring to FIG. 3 and FIG. 9, in the fifth period TP5A, the initialization signal GI may be inactive, the compensation signal GC may be inactive, and the write signal GW may be inactive.

The second transistor T2 may be turned off in response to the inactive state of the write signal GW.

When a voltage obtained by subtracting the first power supply voltage from the data voltage VDATA is lower than the threshold voltage of the fifth transistor T5, the fifth transistor T5 may be turned on.

The light emitting element EE may emit by a current in which flow path of the first transistor T1, the fifth transistor T5 and the light emitting element EE.

According to the embodiment above, the pixel circuit 600 may include five transistors T1 to T5 and three capacitors C1 to C3. The pixel circuit 600 may perform internal compensation and may have a relatively small number of transistors compared to conventional pixel circuits, allowing high integration. Accordingly, the pixel circuit 600 may be applicable to an ultra-high resolution display apparatus. Additionally, the control electrode of the fifth transistor T5 may receive the voltage of the first node N1 instead of the emission signal as in conventional pixel circuits. Accordingly, the display apparatus including the pixel circuit 600 allows for the omission of an emission driver, which may be advantageous for cost reduction and high-resolution design.

Figure 10:
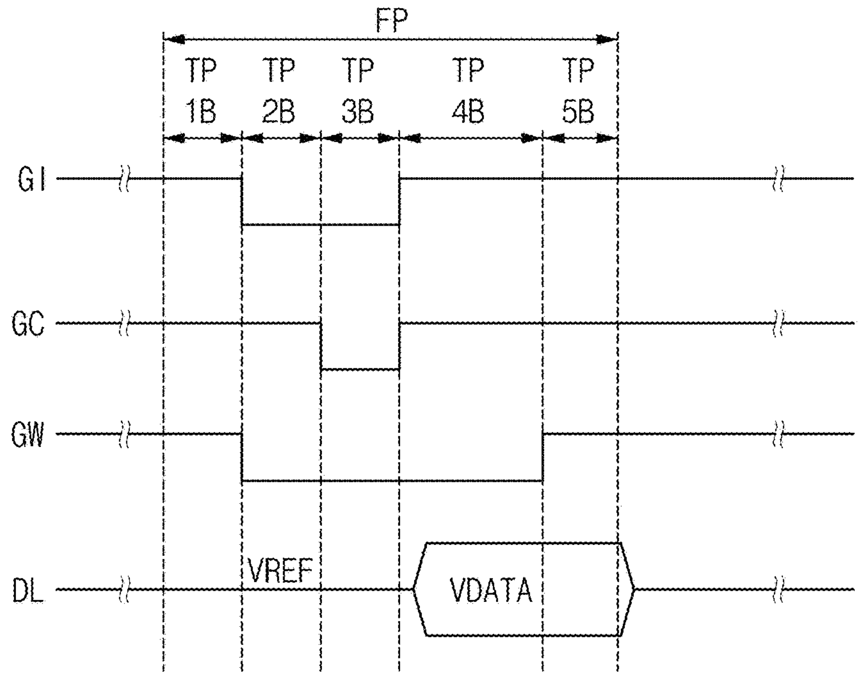
FIG. 10 is a timing diagram illustrating an example of an input signals applied to the pixel circuit of FIG. 2.

FIG. 10 is a timing diagram illustrating an example of input signals applied to the pixel circuit of FIG. 2.

The pixel circuit according to this embodiment is the same as the pixel circuit 600 in FIG. 2, but the driving timing according to this embodiment is different from the driving timing of FIG. 3. The same reference numbers are used for components that are the same or similar to those in the previous embodiment, and redundant descriptions are omitted.

Referring to FIG. 10, in a first period TP1B, the initialization signal GI, the compensation level GC, and write signal GW may be inactive. In a second period TP2B, the initialization signal GI may be active, the compensation level GC may be inactive, and write signal GW may be active. In a third period TP3B, the initialization signal GI may be active, the compensation level GC may be active, and write signal GW may be active. In a fourth period TP4B, the initialization signal GI may be inactive, the compensation level GC may be inactive, and write signal GW may be active. In a fifth period TP5B, the initialization signal GI, the compensation level GC, and write signal GW may have been inactive. Accordingly, a stability of the pixel circuit 600 may increase.

Figure 11:
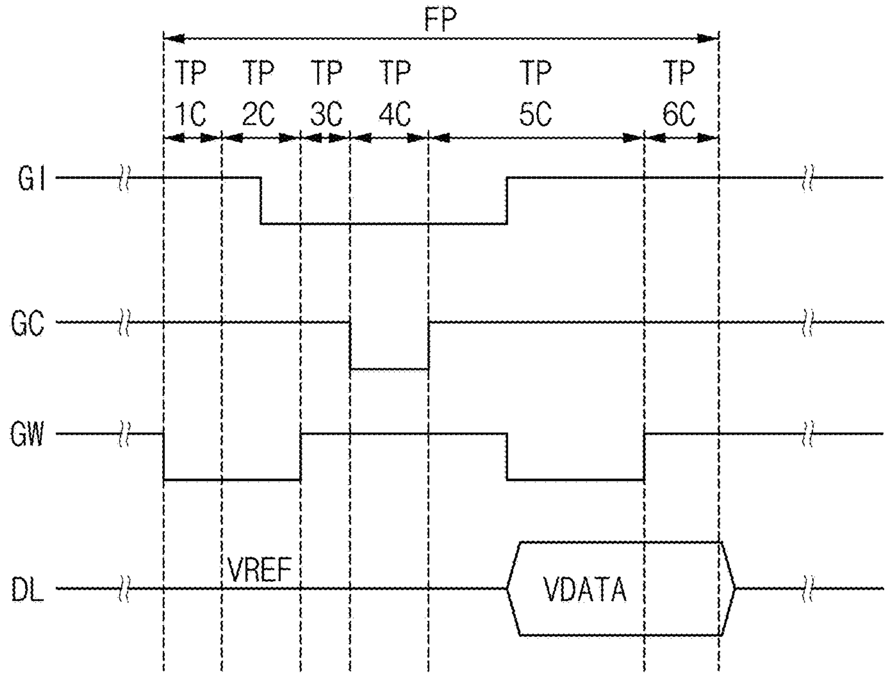
FIG. 11 is a timing diagram illustrating an example of an input signals applied to the pixel circuit of FIG. 2.

FIG. 11 is a timing diagram illustrating an example of input signals applied to the pixel circuit of FIG. 2.

The pixel circuit according to this embodiment is the same as the pixel circuit 600 in FIG. 2, but the driving timing according to this embodiment is different from the driving timing in FIG. 3. The same reference numbers are used for components that are the same or similar to those in the previous embodiment, and redundant descriptions are omitted.

Referring to FIG. 11, in a first period TP1C, the initialization signal GI and the compensation level GC may be inactive and write signal GW may be active. In a second period TP2C, the initialization signal GI may change from inactive to active, the compensation level GC may stay inactive, and write signal may be active. In a third period TP3C, the initialization signal GI may be active, the compensation level GC may stay inactive, and write signal GW may be inactive. In a fourth period TP4C, the initialization signal GI may be active, the compensation level GC may be active, and write signal GW may be inactive. In a fifth period TP5B, the initialization signal GI may change from active to inactive, the compensation level GC may be inactive, and write signal GW may change from inactive to active. In a sixth period TP6C, the initialization signal GI may stay inactive, the compensation signal GC may stay inactive, and the write signal GW may be inactive.

When going from the second period TP2C to the third period TP3C, the write signal GW may change from active to inactive. The second transistor T2 may be turned off in response to an inactive write signal GW. Since the write signal GW may change from inactive to active in the fifth period TP5C, the second transistor T2 may be turned on. Accordingly, a stability of the pixel circuit 600 may increase.

Figure 12:
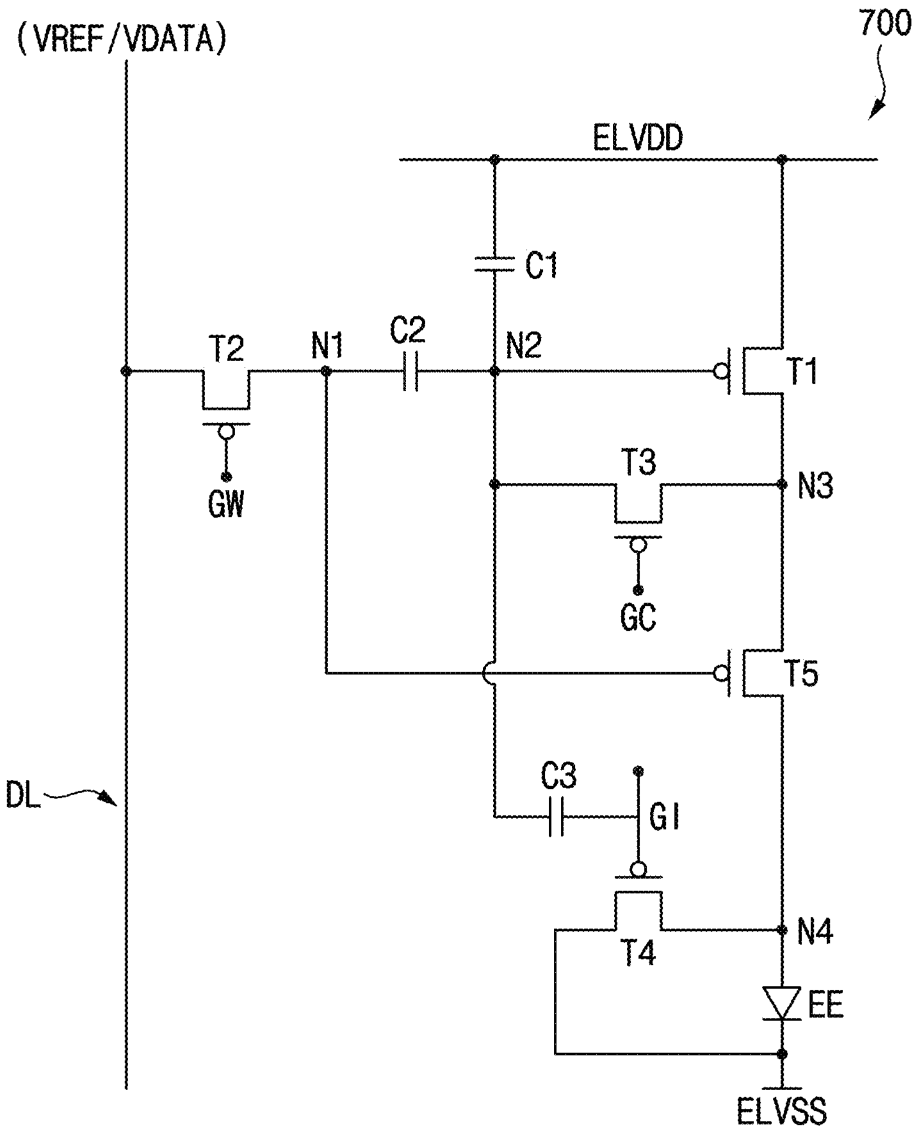
FIG. 12 is a circuit diagram illustrating a pixel circuit according to an embodiment of the present inventive concept.

FIG. 12 is a circuit diagram illustrating a pixel circuit according to an embodiment of the present inventive concept.

The pixel circuit 700 according to this embodiment is different from the pixel circuit 600 in FIG. 2, but the driving timing according to this embodiment is the same as the driving timing in FIG. 3. The same reference numbers are used for components that are the same or similar to those in the previous embodiment, and redundant descriptions are omitted.

Referring to FIG. 12, in this embodiment, the pixel circuit 700 may include the fourth transistor T4 that is connected differently from the pixel circuit 600 of FIG. 2. In the pixel circuit 70I the first electrode of the fourth transistor T4 is configured to receive the second power supply voltage ELVSS. In this embodiment, the initialization voltage VINIT may be the second power supply voltage ELVSS. Accordingly, a line of the initialization voltage VINIT may be the same as a line of the second power supply voltage ELVSS, thereby reducing a voltage line in the display panel 100 and improving integration.

Figure 13:
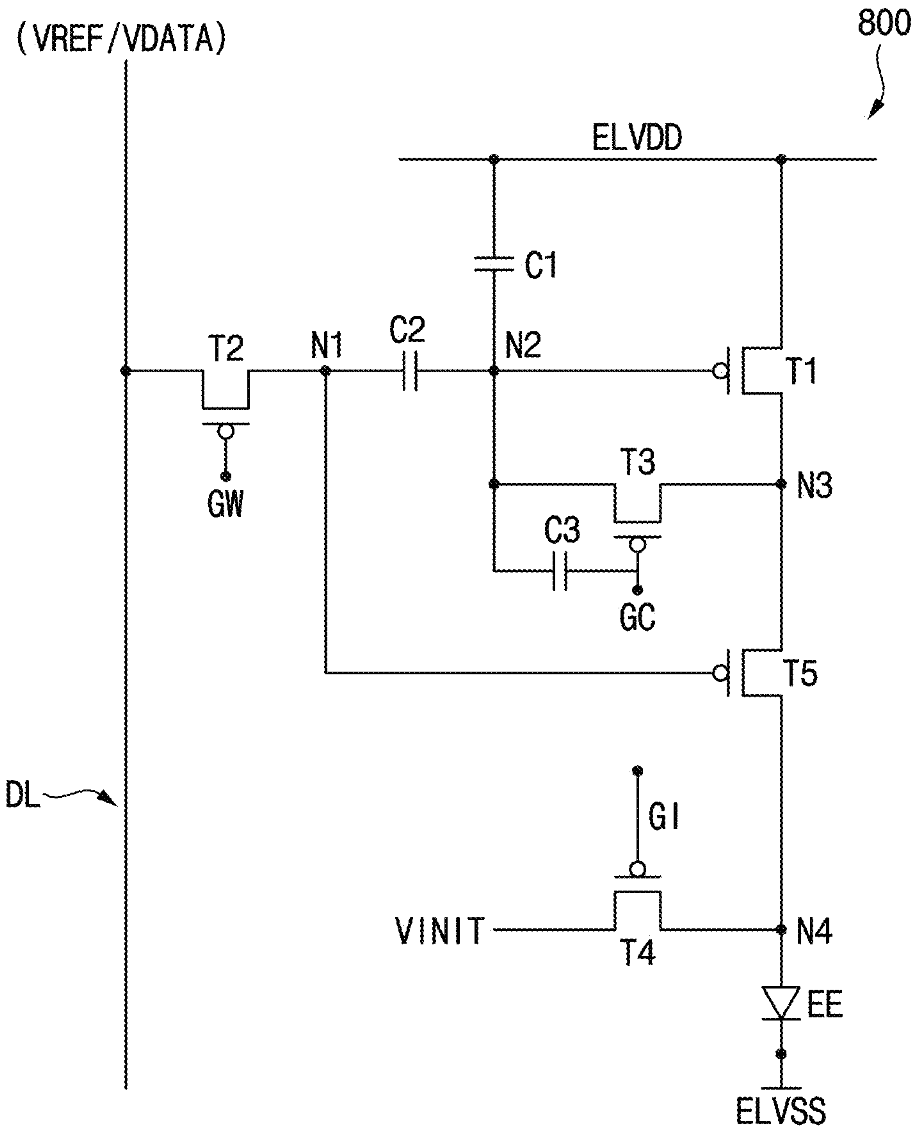
FIG. 13 is a circuit diagram illustrating a pixel circuit according to an embodiment of the present inventive concept.

FIG. 13 is a circuit diagram illustrating a pixel circuit according to an embodiment of the present inventive concept.

The pixel circuit 800 according to this embodiment is different from the pixel circuit 600 in FIG. 2, and the driving timing according to this embodiment is the same as the driving timing in FIG. 3. The same reference numbers are used for components that are the same or similar to those in the previous embodiment, and redundant descriptions are omitted.

Referring to FIG. 13, in this embodiment, the first electrode of the third capacitor C3 of the pixel circuit 800 may be applied to write signal GW. Accordingly, the voltage of the fourth node N4 may be initialized in the second period TP2A and the third capacitor C3 may couple the voltage change of the compensation signal GC between the second period TP2A and the third period TP3A and may apply a coupling voltage to the second node N2. Accordingly, the first transistor T1 may be turned on in response to the voltage of the second node N2.

Figure 14:
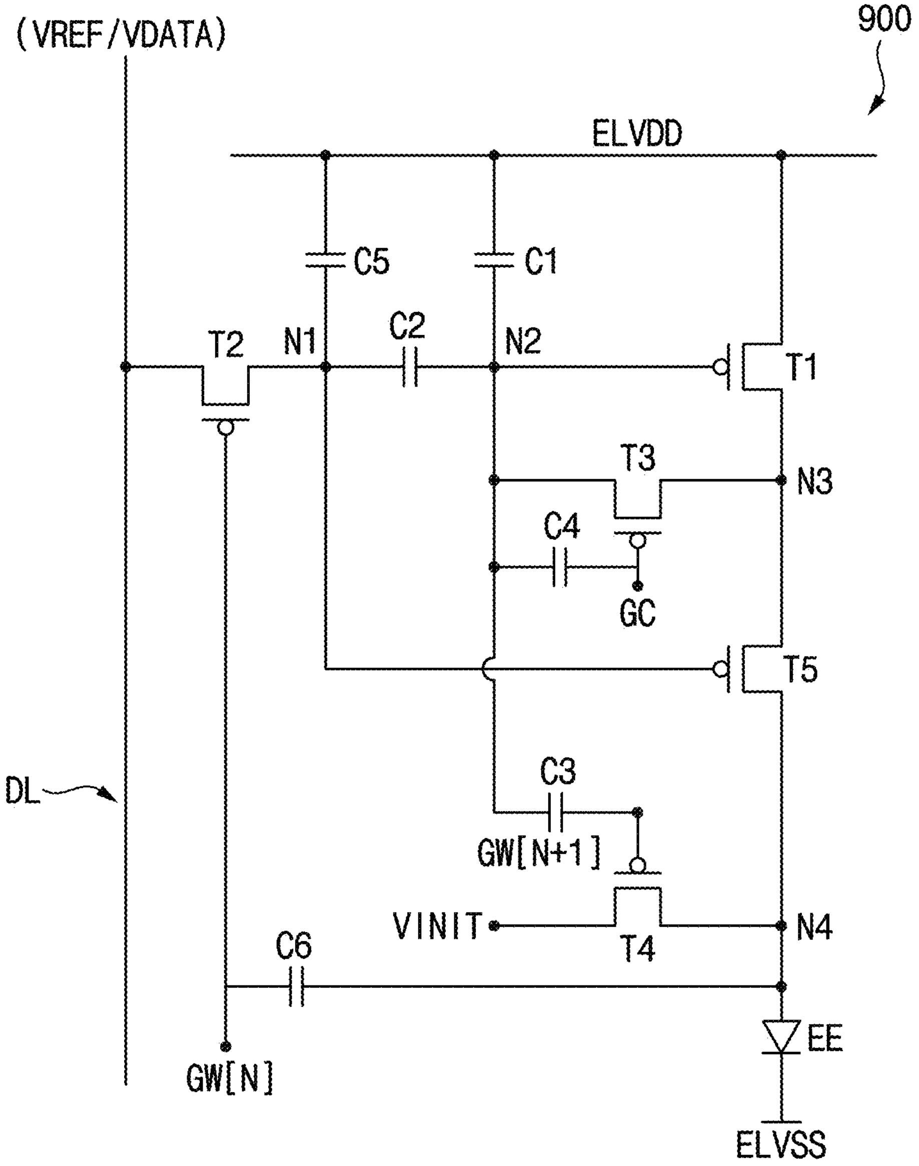
FIG. 14 is a circuit diagram illustrating a pixel circuit according to an embodiment of the present inventive concept.

FIG. 14 is a circuit diagram illustrating a pixel circuit according to an embodiment of the present inventive concept.

The pixel circuit 900 according to this embodiment is similar to the pixel circuit 600 in FIG. 2, but the driving timing according to this embodiment is different from the driving timing in FIG. 3. The same reference numbers are used for components that are the same or similar to those in the previous embodiment, and redundant descriptions are omitted.

Referring to FIG. 14, the pixel circuit 900 may further include a fourth capacitor C4, a fifth capacitor C5 and a sixth capacitor C6. Additionally, the initialization signal GI may be a write signal of a next stage GW[N+1], herein referred to as "next stage write signal." The fourth capacitor C4 may include a first electrode configured to receive the compensation signal GC and a second electrode connected to the second node N2. The fifth capacitor C5 may include a first electrode configured to receive the first power supply voltage ELVDD and a second electrode connected to the first node N1. The sixth capacitor C6 may include a first electrode connected to the fourth node N4 and a second electrode configured to receive the write signal GW.

Figure 15:
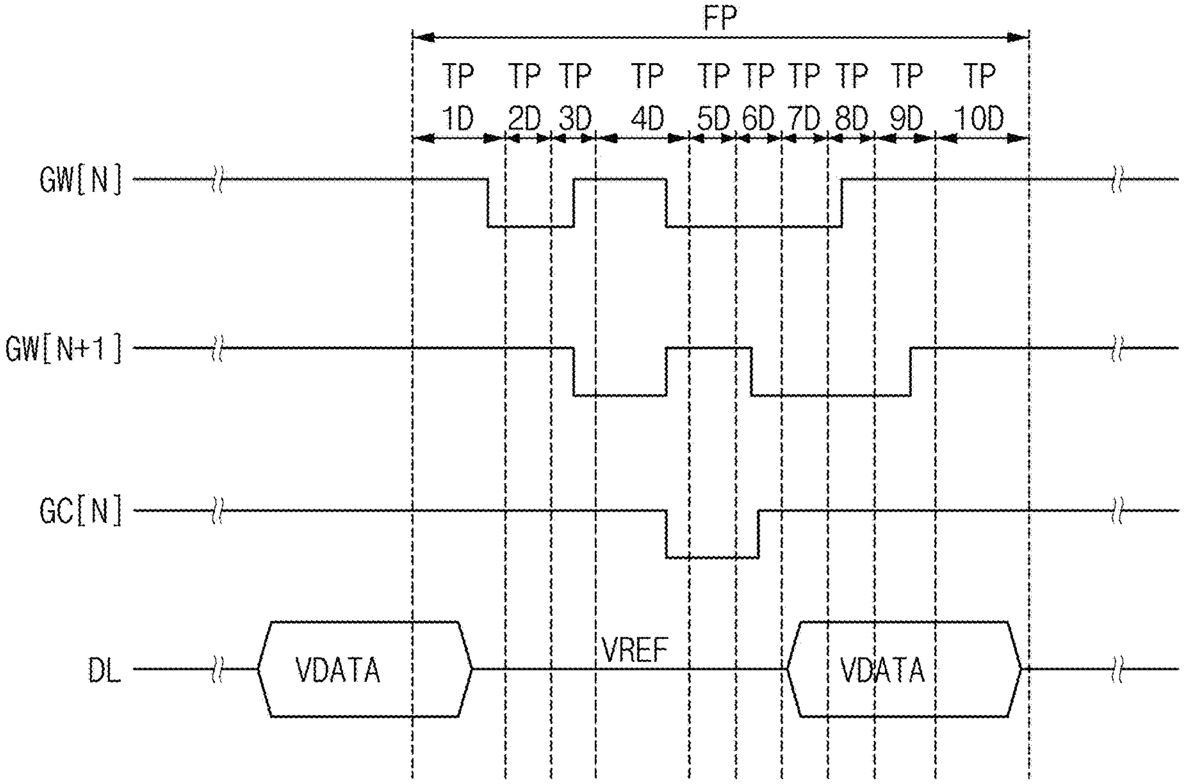
FIG. 15 is a timing diagram illustrating an example of an input signals applied to the pixel circuit of FIG. 14.
Figure 16:
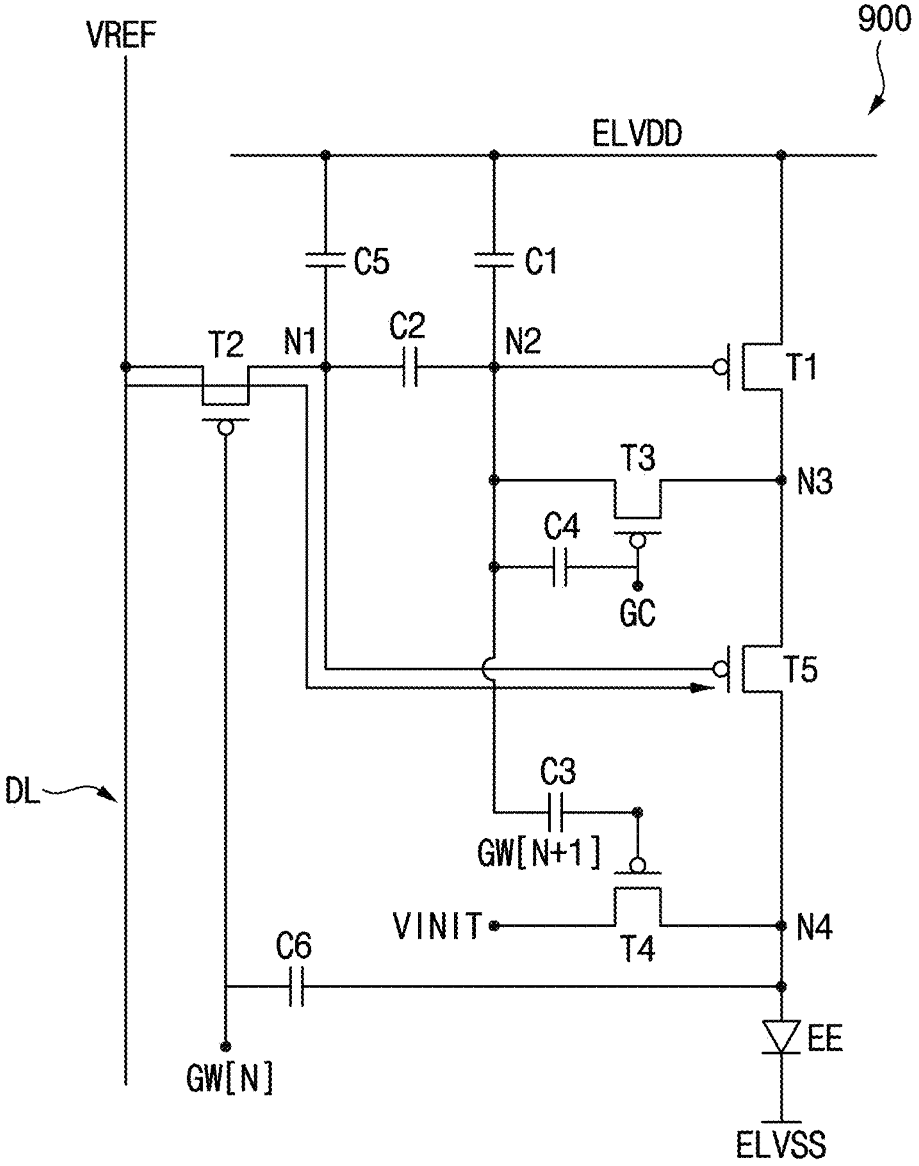
FIG. 16 is a circuit diagram for describing the operation of the pixel circuit of FIG. 14 in a first period.
Figure 17:
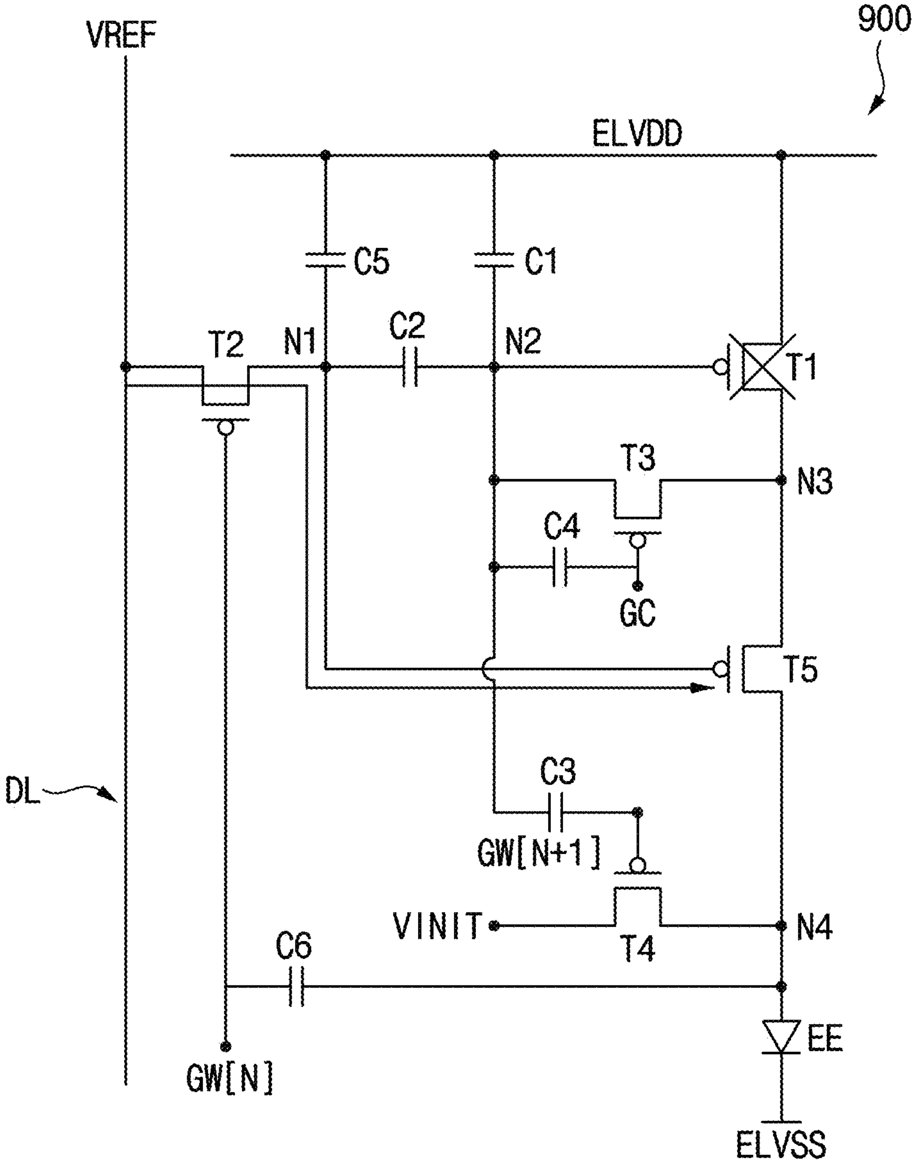
FIG. 17 is a circuit diagram for describing the operation in a second period of the pixel circuit of FIG. 14 in which the first transistor has turn-off state in the first period.
Figure 18:
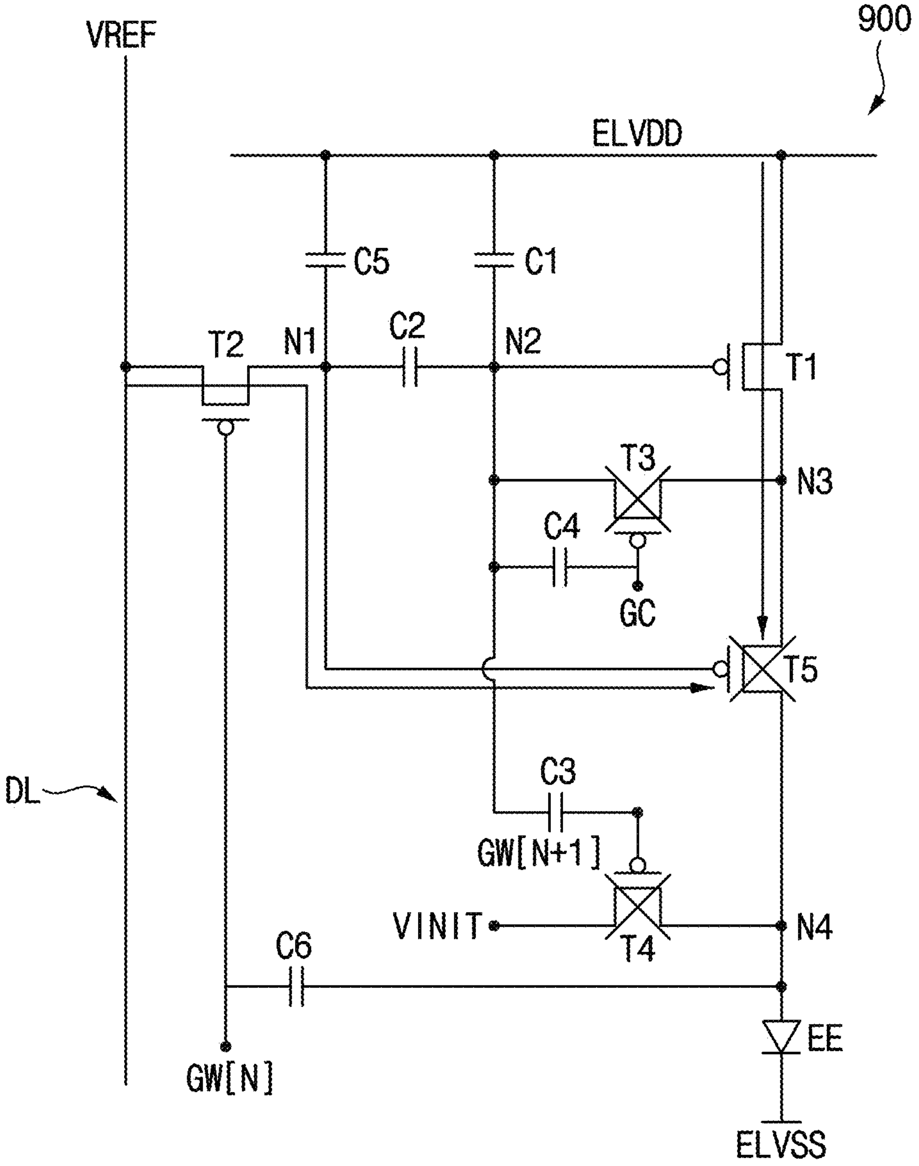
FIG. 18 is a circuit diagram for describing the operation in a second period of the pixel circuit of FIG. 14 in which the first transistor has turn-on state in the first period.
Figure 19:
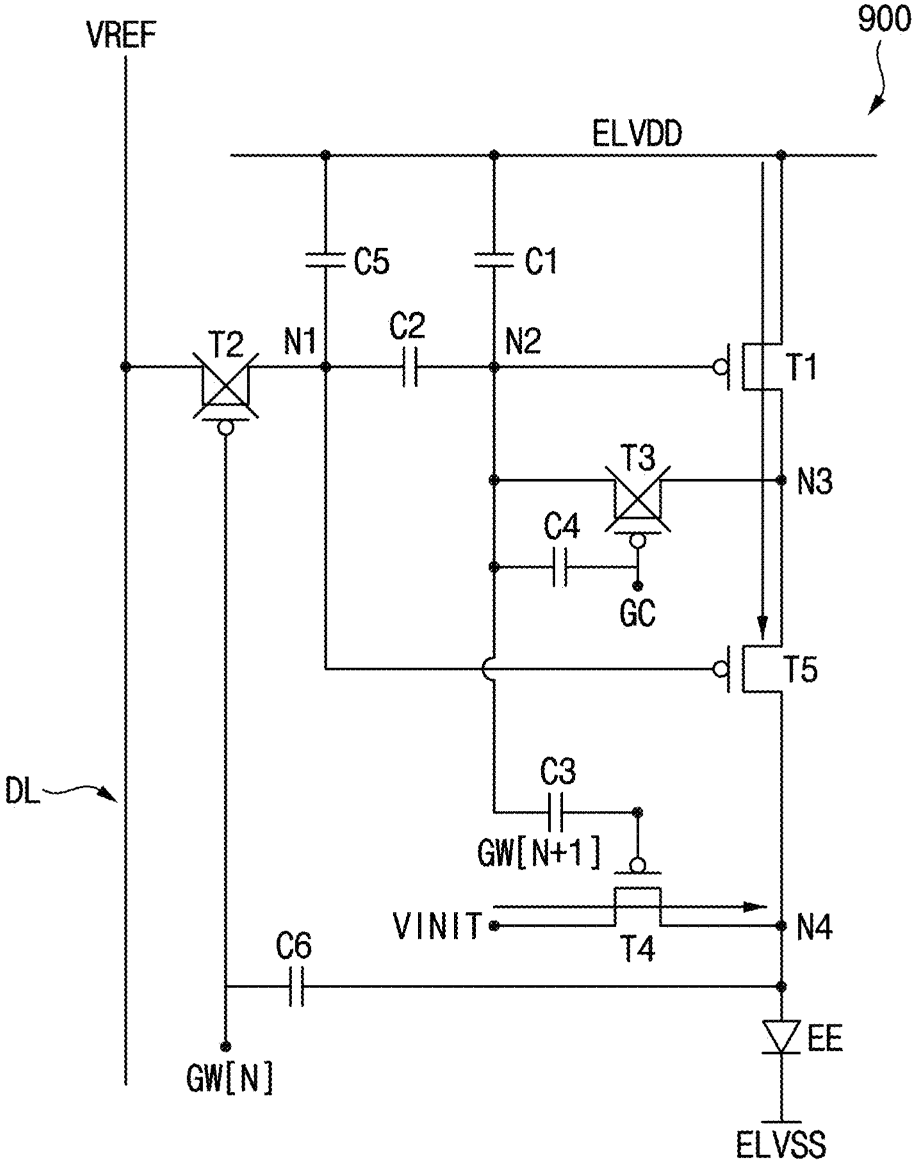
FIG. 19 is a circuit diagram for describing the operation of the pixel circuit of FIG. 14 in a third period.
Figure 20:
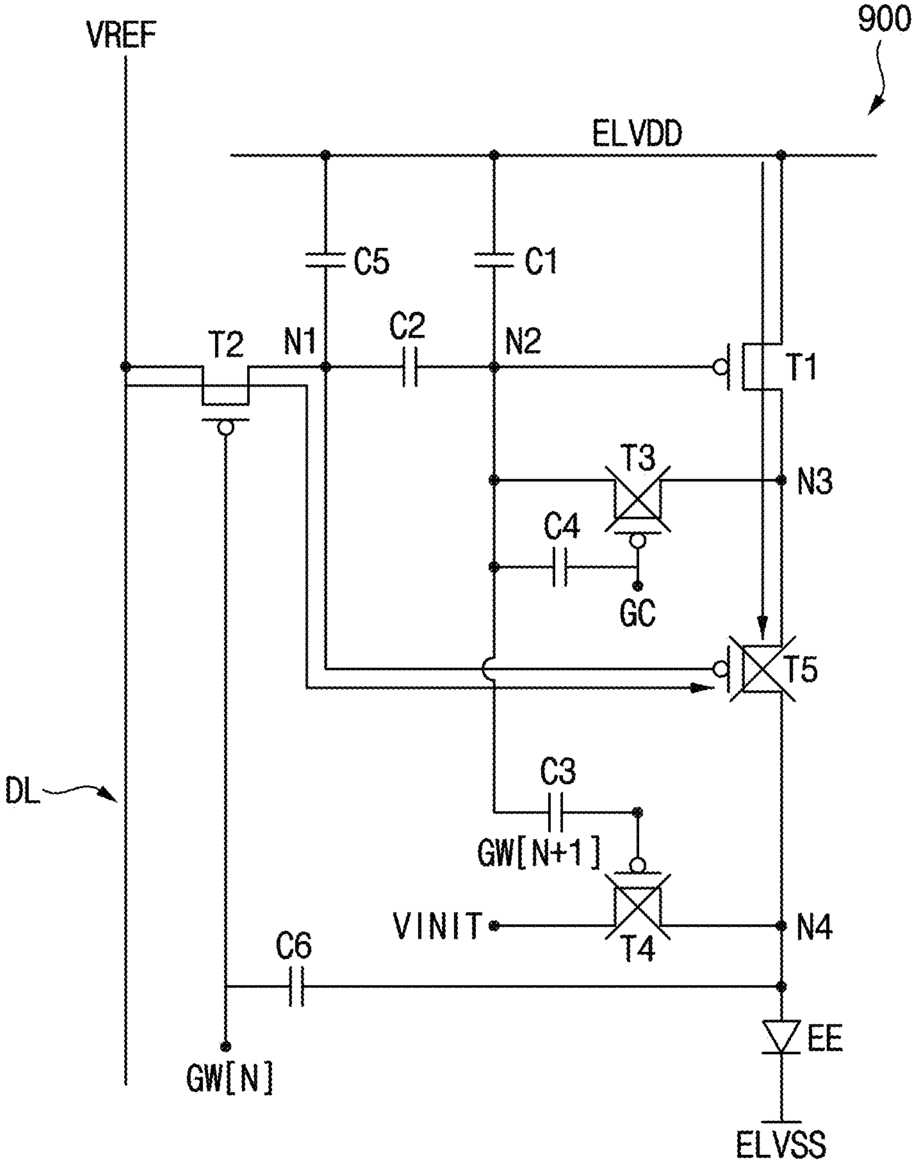
FIG. 20 is a circuit diagram for describing the operation of the pixel circuit of FIG. 14 in a fourth period.
Figure 21:
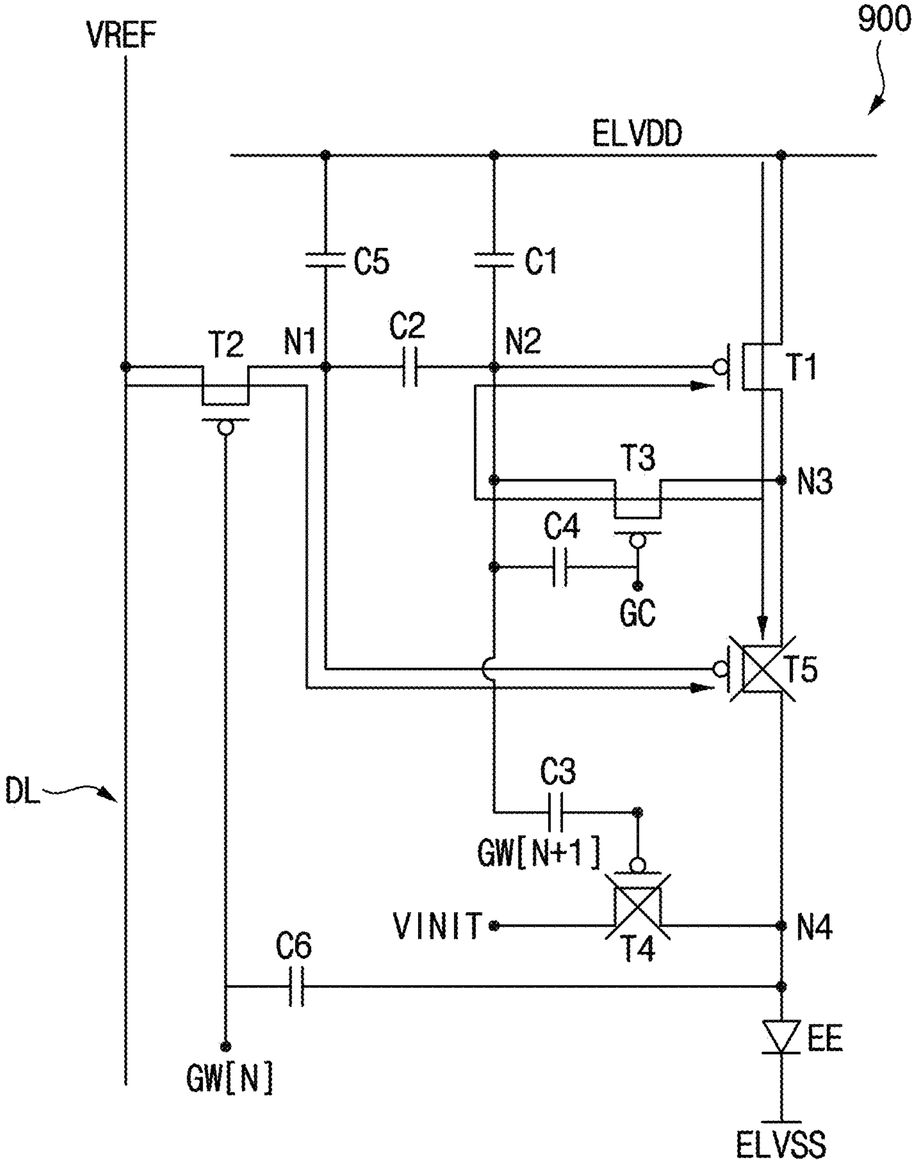
FIG. 21 is a circuit diagram for describing the operation of the pixel circuit of FIG. 14 in a fifth period.
Figure 22:
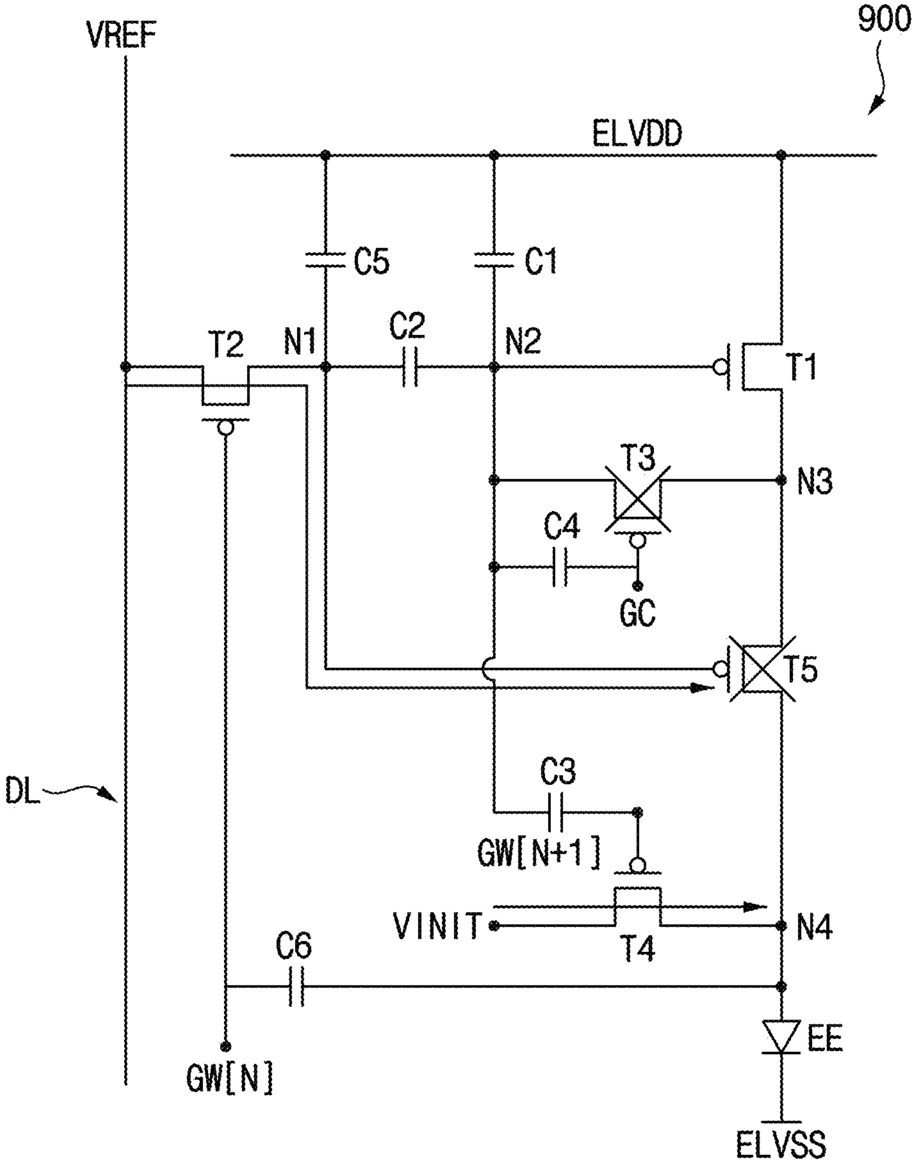
FIG. 22 is a circuit diagram for describing the operation of the pixel circuit of FIG. 14 in a sixth period.
Figure 23:
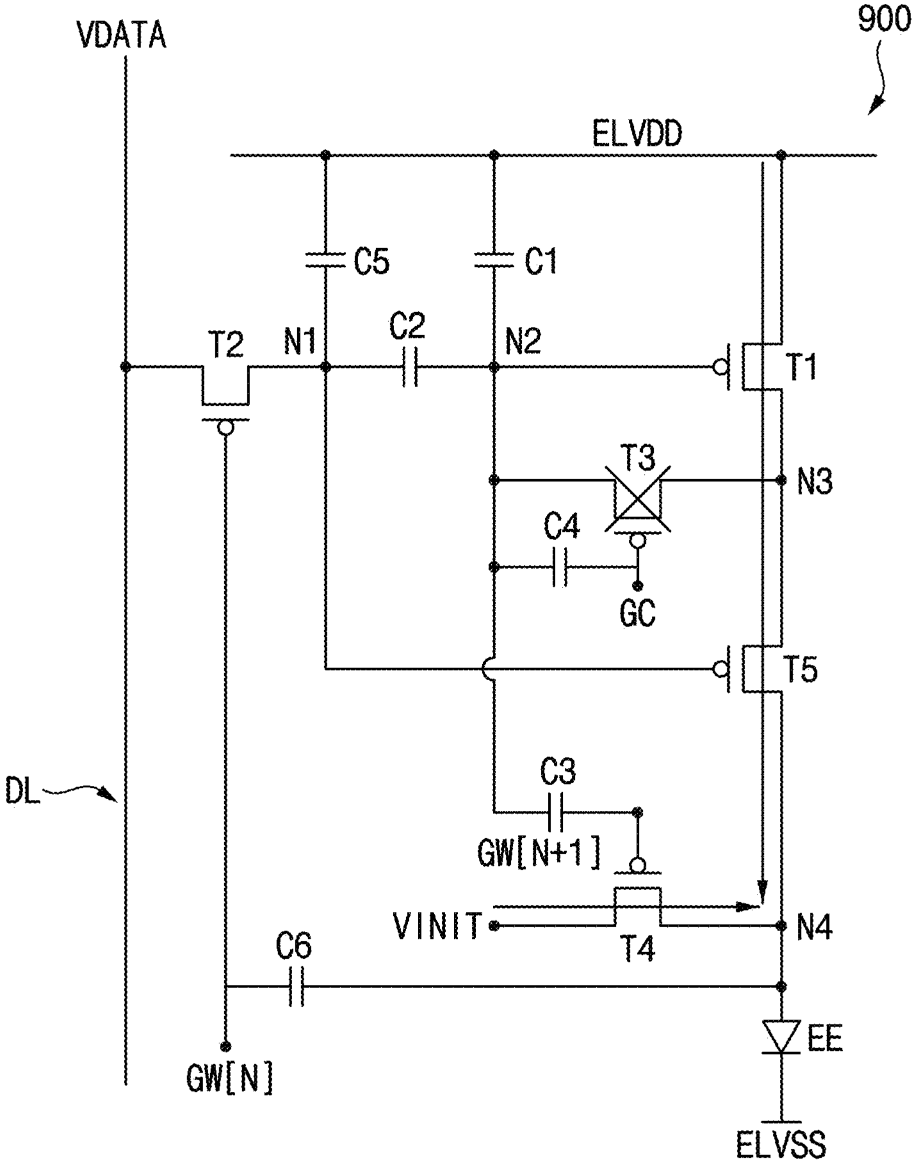
FIG. 23 is a circuit diagram for describing the operation of the pixel circuit of FIG. 14 in a seventh period.
Figure 24:
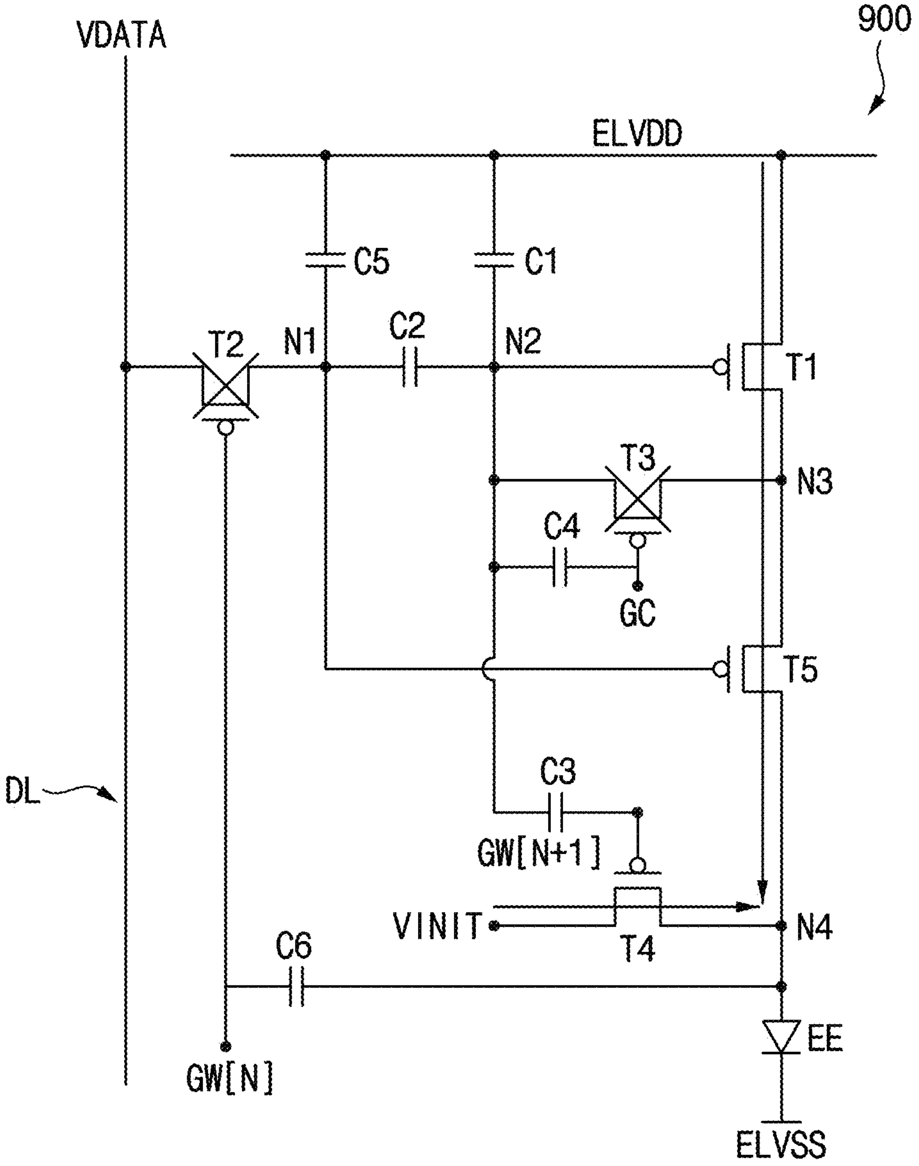
FIG. 24 is a circuit diagram for describing the operation of the pixel circuit of FIG. 14 in an eighth period.
Figure 25:
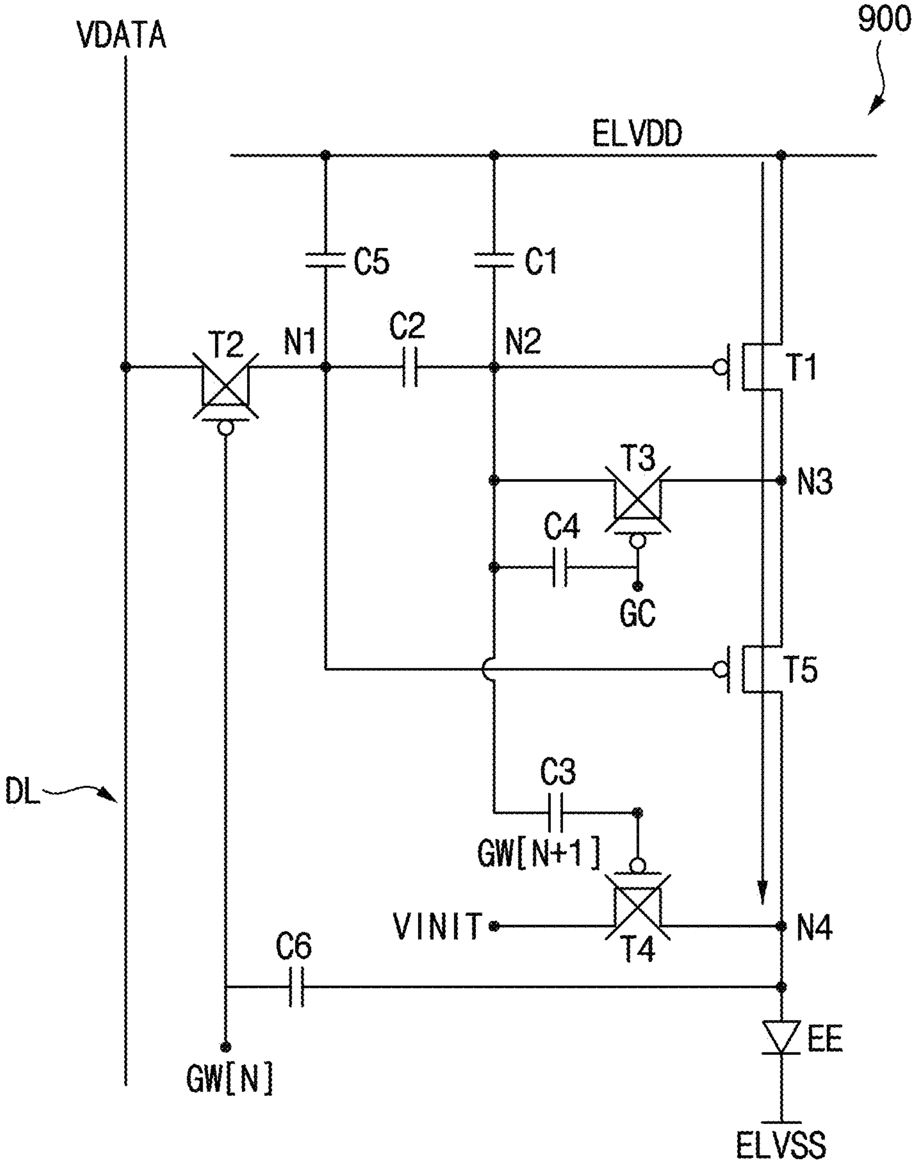
FIG. 25 is a circuit diagram for describing the operation of the pixel circuit of FIG. 14 in a ninth period.
Figure 26:
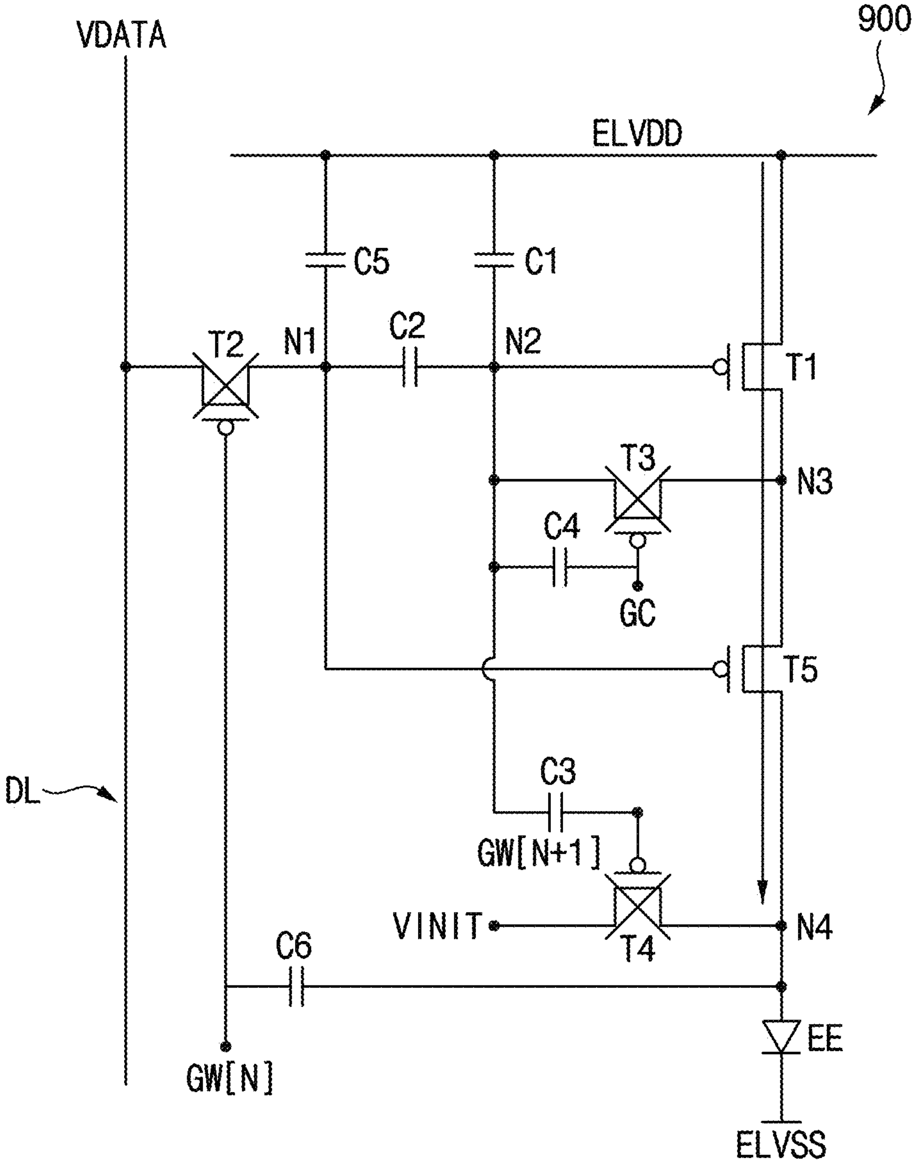
FIG. 26 is a circuit diagram for describing the operation of the pixel circuit of FIG. 14 in a tenth period.

FIG. 15 is a timing diagram illustrating an example of input signals applied to the pixel circuit of FIG. 14. FIG. 16 is a circuit diagram for describing the operation of the pixel circuit of FIG. 14 in a first period. FIG. 17 is a circuit diagram for describing the operation in a second period of the pixel circuit of FIG. 14, with the first transistor is turned off in the first period. FIG. 18 is a circuit diagram for describing the operation in a second period of the pixel circuit of FIG. 14, with the first transistor turned on in the first period. FIG. 19 is a circuit diagram for describing the operation of the pixel circuit of FIG. 14 in a third period. FIG. 20 is a circuit diagram for describing the operation of the pixel circuit of FIG. 14 in a fourth period. FIG. 21 is a circuit diagram for describing the operation of the pixel circuit of FIG. 14 in a fifth period. FIG. 22 is a circuit diagram for describing the operation of the pixel circuit of FIG. 14 in a sixth period. FIG. 23 is a circuit diagram for describing the operation of the pixel circuit of FIG. 14 in a seventh period. FIG. 24 is a circuit diagram for describing the operation of the pixel circuit of FIG. 14 in an eighth period. FIG. 25 is a circuit diagram for describing the operation of the pixel circuit of FIG. 14 in a ninth period. FIG. 26 is a circuit diagram for describing the operation of the pixel circuit of FIG. 14 in a tenth period.

Referring to FIG. 15 to FIG. 26, a frame period of the pixel circuit 900 may comprise a first period TP1D, a second period TP2D, a third period TP3D, a fourth period TP4D, a fifth period TP5D, a sixth period TP6D, a seventh period TP7D, an eighth period TP8D, a ninth period TP9D and a tenth period TP10D. The first period TP1D may be an initialization start period. The second period TP2D may be a second node initialization period. The third period TP3D may be a fourth node initialization period. The fourth period TP4D may be a compensation preparation period. The fifth period TP5D may be a compensation period. The sixth period TP6D may be a compensation complete period. The seventh period TP7D may be a data writing period. The eighth period TP8D may be a final compensation voltage writing preparation period. The ninth period TP9D may be a final compensation voltage writing period. The tenth period TP10D may be an emission period.

Referring to FIG. 15 and FIG. 16, in the first period TP1D, the write signal GW[N] may change from inactive to active, the next stage write signal GW[N+1] may be inactive, and the compensation signal GC[N] may be inactive.

Referring to FIG. 16, in the first period TP1D, as the write signal GW[N] changes from inactive to active, the second transistor T2 may be turned on. Accordingly, the reference voltage VREF may be applied to the control electrode of the fifth transistor T5. The fifth transistor T5 may be turned off in response to the reference voltage VREF.

The second capacitor C2 may couple a voltage difference between the data voltage VDATA and the reference voltage VREF and may apply the voltage difference to the second node N2.

The sixth capacitor C6 may couple a voltage difference between the high level of the write signal GW and the low level of the write signal GW and may apply the voltage difference to the second node N2.

Referring to FIG. 15. FIG. 17 and FIG. 18, in the second period TP2D, the write signal GW[N] may be active, the next stage write signal GW[N+1] may be inactive, and the compensation signal GC may be inactive.

Referring to FIG. 17, when the first transistor T1 is in a turned-off state, the voltage of the second node N2 may be higher than a sum of the first power supply voltage ELVDD and the threshold voltage of the first transistor T1. For example, when the first power supply voltage is about 7V and the threshold voltage of the first transistor T1 is about −1.52V, the voltage of the second node N2 may be higher than about 5.48 V.

When the first transistor T1 is turned off, a voltage of the first electrode (for example, source) of the first transistor T1 is subtracted from the voltage of the control electrode of the first transistor T1 to compute a difference, and this difference is higher than the threshold voltage of the first transistor T1. In this case, the third transistor T3 may be in a turned-on state or a turned-off state.

When the third transistor T3 is in a turned-off state, a voltage of the first electrode (for example, source) of the third transistor T3 is subtracted from the voltage of the control electrode of the third transistor T3, and this difference is higher than the threshold voltage of the third transistor T3. In this case, the fifth transistor T5 may have a turned-on state or a turned-off state.

When the fifth transistor T5 is in a turned-off state, the voltage of the fourth node N4 may be same as the voltage of the fourth node N4 of the first period TP1D. When the fifth transistor T5 is in a turned-off state, the fourth transistor T4 may be in a turned-on state or a turned-off state. When the fourth transistor T4 is in a turned-off state, the voltage of the fourth node N4 may be lower than a voltage difference obtained by subtracting the threshold voltage of the fourth transistor T4 from a voltage of the next stage write signal GW[N+1]. When the fourth transistor T4 is in a turned-on state, the voltage of the fourth node N4 may be higher than a voltage difference obtained by subtracting the threshold voltage of the fourth transistor T4 from a voltage of the next stage write signal GW[N+1]. When the fourth transistor T4 is turned on, the initialization voltage VINIT may be applied to the fourth node N4.

When the third transistor T3 is in a turned-on state, a voltage of the compensation signal GC may be lower than a sum of the voltage of the second node N2 and the threshold voltage of the third transistor T3.

When the third transistor T3 is in a turned-on state, the voltage of the first electrode (for example, source) of the third transistor T3 is subtracted from the voltage of the control electrode of the third transistor T3 to compute a difference, and this difference is lower than the threshold voltage of the third transistor T3. In this case, the fifth transistor T5 may have a turned-on state or a turned-off state. When the fifth transistor T5 is in a turned-off state, the voltage of the fourth node N4 may be same as the voltage of the fourth node N4 of the first period TP1D. Additionally, the voltage of the third node N3 may be same as the voltage of the second node N2. Since the fifth transistor may be in a turned-off state, a voltage difference obtained by subtracting the voltage of the first electrode of the fifth transistor T5 from the voltage of the control electrode of the fifth transistor T5 may be higher than the threshold voltage of the fifth transistor T5. Accordingly, the voltage of the second node N2 may be lower than a voltage difference obtained by subtracting the voltage of the first electrode of the fifth transistor T5 from the reference voltage VREF. For example, when the reference voltage is about 9V and the threshold voltage of the fifth transistor T5 is about −1.52V, the voltage of the third node N3 may be about 10.52V.

When the fifth transistor T5 is in a turned-on state, the fourth transistor T4 may be in a turned-on state or a turned-off state. When the fourth transistor T4 is turned off, the voltage of the fourth node N4 is lower than a voltage difference obtained by subtracting the threshold voltage of the fourth transistor T4 from the voltage of the write signal of a next stage. In this case, the initialization voltage VINIT may be applied to the fourth node N4. Accordingly, the initialization voltage VINIT may be applied to the second node N2. When the fourth transistor T4 is in a turned-on state, the voltage of the fourth node N4 is higher than a voltage difference obtained by subtracting the threshold voltage of the fourth transistor T4 from the voltage of the write signal of a next stage. In this case, the initialization voltage VINIT may be applied to the fourth node N4. Since the initialization voltage VINIT may be applied to the fourth node N4, the initialization voltage VINIT may be applied to the second node N2. For example, the initialization voltage VINIT may be about −4V.

Accordingly, the voltage of the second node N2 may be lower than a voltage difference obtained by subtracting the threshold voltage of the third transistor T3 from the voltage of the high level of the compensation signal GC.

Referring to FIG. 18, when the first transistor T1 is in a turned-on state, the voltage of the second node N2 may be lower than a sum of the power supply voltage ELVDD and the threshold voltage of the first transistor T1. Additionally, the fourth transistor T4 and the fifth transistor T5 may be in turned-off states.

Referring to FIG. 17 and FIG. 18, in the second period TP2D, regardless of whether the first transistor T1 is in a turned-off state or a turned-on state, the voltage of the second node N2 may be initialized. Additionally, in the second period TP2D, regardless of whether the third transistor T3 is in a turned-off state or a turned-on state, the voltage of the second node N2 may be initialized. Additionally, in the second period TP2D, regardless of whether the fourth transistor T4 is in a turned-off state or a turned-on state, the voltage of the second node N2 may be initialized.

Referring to FIG. 15 and FIG. 19, in the third period TP3D, the write signal GW[N] may change from active to inactive, the next stage write signal GW[N+1] may change from inactive to active, and the compensation signal GC may be inactive.

Referring to FIG. 19, since the write signal GW may change from active to inactive, the second transistor T2 may be turned off. Since the next stage write signal GW[N+1] may change from inactive to active, the fourth transistor T4 may be turned-on. Accordingly, the fourth node N4 may be initialized to the initialization voltage VINIT. The third capacitor C3 may couple a change of the next stage write signal GW[N+1] and may apply the change of the next stage write signal GW[N+1] to the second node N2. Since a voltage difference obtained by subtracting the voltage of the first electrode (for example, source) of the first transistor T1 from the voltage of the second node N2 may be lower than the threshold voltage of the first transistor T1, the first transistor T1 may be turned on. Since a voltage difference obtained by subtracting the voltage at the second node N2 from the voltage of the control electrode of the third transistor T3 may be higher than the threshold voltage of the third transistor T3, the third transistor T3 may be turned off. For example, in the second period TP2D, when the voltage of the second node N2 may be about 10.52V, the threshold voltage of the first transistor T1 may be about −1.52V, the voltage of the low level of the write signal of a next stage may be about-28V, the voltage of the high level of the write signal of a next stage may be about 11V and capacitance ratio of the first capacitor C1, the second capacitor C2, the third capacitor C3 and the fourth capacitor C4 may be 1:49:20:30, the voltage the third capacitor C3 applies by coupling the change in the initialization signal GI may be about −7.8V, and the voltage of the second node N2 may be about 2.72V.

Referring to FIG. 15 and FIG. 20, in the fourth period TP4D, the write signal GW may change from inactive to active, the next stage write signal GW[N+1] may change from active to inactive, and the compensation signal GC may change from inactive to active.

Referring to FIG. 20, since the next stage write signal GW[N+1] may change from active to inactive, the fourth transistor T4 may be turned off. Since the next stage write signal GW[N+1] may change from active to inactive, the third capacitor C3 may couple a change of the next stage write signal GW[N+1] and apply the change of the next stage write signal GW[N+1] to the second node N2. Accordingly, the first transistor T1 may maintain a turned-on state. Since the write signal GW may change from inactive to active, the sixth capacitor C6 may couple a change of the write signal GW and apply the change of the write signal GW to the fourth node N4. Since a voltage difference obtained by subtracting a voltage of the fourth node N4 from a voltage of the control electrode of the fifth transistor T5 may higher than a threshold voltage of the fifth transistor T5, the fifth transistor T5 may be turned off.

Referring to FIG. 15 and FIG. 21, in the fifth period TP5D, the write signal GW may be active, the next stage write signal GW[N+1] may be inactive, and the compensation signal GC may be active.

Referring to FIG. 21, the first power supply voltage ELVDD may be applied to the first electrode of the first capacitor C1, and a voltage of the second electrode of the first capacitor C1 may be the voltage of the second node N2, which is a sum of the first power supply voltage and the threshold voltage of the first transistor T1. Accordingly, the threshold voltage of the first transistor T1 may be stored between the first electrode of the first capacitor C1 and the second electrode of the first capacitor C1. The operation of storing the threshold voltage of the first transistor T1 between the first electrode of the first capacitor C1 and the second electrode of the first capacitor C1 is herein referred to as a "compensation operation."

Referring to FIG. 15 and FIG. 22, in the sixth period TP6D, the write signal GW[N] may be active, the next stage write signal GW[N+1] may change from inactive to active, and the compensation signal GC may change from active to inactive. For example, when the first power supply voltage is about 7V and the threshold voltage of the first transistor T1 is about-1.52V, the voltage of the second node N2 may be about 5.48V.

Referring to FIG. 22, since the compensation signal GC may change from active to inactive, the third transistor T3 may be turned off. Since the next stage write signal GW[N+1] may change from inactive to active, the fourth transistor T4 may be turned on. Accordingly, the voltage of the fourth node N4 may be initialized to the initialization voltage VINIT. Since the voltage of the fourth node N4 may have the initialization voltage VINIT, the fifth transistor T5 may be turned off. The voltage of the second node N2 may be the same as the voltage of the second node N2 of the fifth period TP5D.

Referring to FIG. 15 and FIG. 23, the write signal GW may be active, the next stage write signal GW[N+1] may be active, and the compensation signal GC may be inactive.

Referring to FIG. 23, the second transistor T2 may be turned on in response to the write signal GW. The second capacitor C2 may apply the data voltage VDATA to the second node N2.

In the seventh period TP7D, the voltage of the first node N1 may be the data voltage VDATA and the voltage of the second node N2 may be ELVDD+T1_VTH+C2/(C1+C2+C3+C4)*(VDATA−VREF). Here, C1 refers to a capacitance of the first capacitor C1, C2 refers to a capacitance of the second capacitor C2, C3 refers to a capacitance of the third capacitor C3, and C4 refers to the capacitance of the fourth capacitor C4. Additionally, T1_VTH refers to the threshold voltage of the first transistor T1. For example, when the first power supply voltage ELVDD is about 7V, the threshold voltage of the first transistor T1 is about −1.52V, the data voltage VDATA is about −13V, the reference voltage VREF is about −9V and a capacitance ratio of the first capacitor C1, the second capacitor C2, the third capacitor C3 and the fourth capacitor C4 is about 1:49:20:30, the voltage of the second node N2 may be about −5.3V.

Referring to FIG. 15 and FIG. 24, in the eighth period TP8D, the write signal GW may change from active to inactive, the next stage write signal GW[N+1] may be active, and the compensation signal GC may be inactive.

Referring to FIG. 24, since the write signal GW may change from active to inactive, the second transistor T2 may be turned off. The voltage of the second node N2 may be same as the voltage of the second node N2 of the seventh period TP7D.

Referring to FIG. 15 and FIG. 25, in the ninth period TP9D, the write signal GW may be inactive, the next stage write signal GW[N+1] may change from active to inactive, the compensation signal GC may be inactive.

Referring to FIG. 25, since the next stage write signal GW[N+1] may change from active to inactive, the fourth transistor T4 may be turned off. The third capacitor C3 may couple a change of the next stage write signal GW[N+1] and apply the change of the next stage write signal GW[N+1] to the second node N2. The second capacitor C2 may apply the data voltage VDATA to the second node N2 using a bootstrapping method.

The voltage of the second node N2 may be the final compensation voltage. The final compensation voltage may be ELVDD+T1_VTH+C2/(C1+C2+C3+C4)*(VDATA−VREF)+C3/(C1+C4+C3+C5C2Eq.cap) (−1*GW[N+1][TP8D]+GW[N+1][TP9D])). C1 refers to the capacitance of the first capacitor C1, C2 refers to the capacitance of the second capacitor C2, C3 refers to the capacitance of the third capacitor C3, C4 refers to the capacitance of the fourth capacitor C4. Also, T1_VTH refers the threshold voltage of the first transistor, C5C2Eq.cap refers an equivalent capacitance of a capacitance of the fifth capacitor C5 and the capacitance of the second capacitor C2, GW[N+1][TP8D] refers to the voltage of the write signal of a next stage GW[N+1] of the eighth period TP8D, GW[N+1][TP9D] refers to the voltage of the next stage write signal GW[N+1] of the ninth period TP9D. Accordingly, the second node N2 may have the final compensation voltage. For example, when the value of ELVDD+T1_VTH+C2/(C1+C2+C3+C4)*(VDATA−VREF) is about −5.3V, the voltage of the high level of the next stage write signal GW[N+1] is about 11V, the voltage of the low level of the next stage write signal GW[N+1] is about −28V, and a capacitance ratio of the first capacitor C1, the second capacitor C2, the third capacitor C3, the fourth capacitor C4, the fifth capacitor C5 and the sixth capacitor C6 is 1:49:20:30:451:20, the voltage of the second node N2 may be about 2.8935V.

Referring to FIG. 15 and FIG. 26, in the tenth period TP10D, the write signal GW[N] may be inactive, the next stage write signal GW[N+1] may be inactive, and the compensation signal GC may be inactive.

Referring to FIG. 26, when a voltage difference obtained by subtracting the first power supply voltage ELVDD from the data voltage VDATA is lower than the threshold voltage of the fifth transistor T5, the fifth transistor may be turned on.

The light emitting element EE may emit light in response to current that flows through the first transistor T1, the fifth transistor T5 and the light emitting element EE.

According to this embodiment, the pixel circuit 900 may include five transistors T1 to T5 and six capacitors C1 to C6. The pixel circuit 900 may perform internal compensation and may have a relatively small number of transistors compared to conventional pixel circuits, enabling high integration. Accordingly, the pixel circuit 900 may be applicable to an ultra-high resolution display apparatus. Additionally, the control electrode of the fifth transistor T5 may receive the voltage of the first node N1 rather than the emission signal. Accordingly, the display apparatus including the pixel circuit 900 may operate without an emission driver, leading to cost reduction and high-resolution design.

Figure 27:
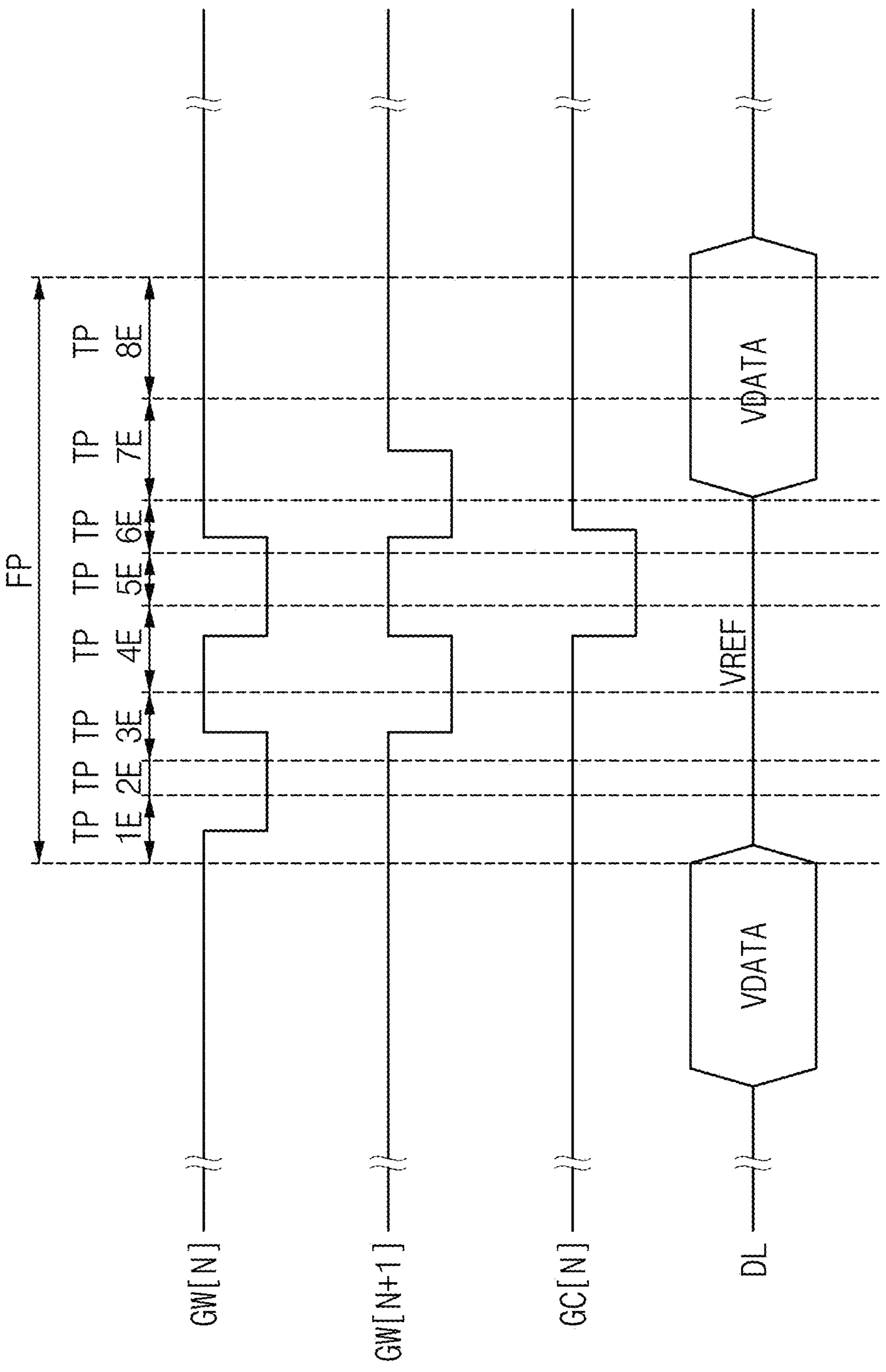
FIG. 27 is a timing diagram illustrating an example of an input signals applied to the pixel circuit of FIG. 14.

FIG. 27 is a timing diagram illustrating an example of input signals applied to the pixel circuit of FIG. 14.

The pixel circuit according to this embodiment is the same as the pixel circuit 900 in FIG. 14, but the driving timing according to this embodiment is different from the driving timing in FIG. 15. The same reference numbers are used for components that are the same or similar to those in the previous embodiment, and redundant descriptions are omitted.

Referring to FIG. 27, in a first period, the write signal GW[N] may change from inactive to active, the next stage write signal GW[N+1] may be inactive, and the compensation signal GC[N] may be inactive. In a second period TP2E, the write signal GW[N] may be active, the next stage write signal GW[N+1] may be inactive, and the compensation signal may be inactive. In a third period TP3E, the write signal GW[N] may change from active to inactive, the next stage write signal GW[N+1] may change from inactive to active, and the compensation signal GC may stay inactive. In a fourth period TP4E, the write signal GW[N] may change from inactive to active, the next stage write signal GW[N+1] may change from active to inactive, and the compensation signal GC may change from inactive to active. In a fifth period TP5E, the write signal GW[N] may be active, the next stage write signal GW[N+1] may be inactive, and the compensation signal GC may be active. In a sixth period TP6E, the write signal GW[N] may change from active to inactive, the next stage write signal GW[N+1] may change from inactive to active, and the compensation signal GC may change from active to inactive. In a seventh period TP7E, the write signal GW[N] may stay inactive, the next stage write signal GW[N+1] may change from active to inactive, and the compensation signal GC may stay inactive. In an eighth period TP8E, the write signal GW[N] may be inactive, the next stage write signal GW[N+1] may be inactive, and the compensation signal GC may be inactive.

Figure 28:
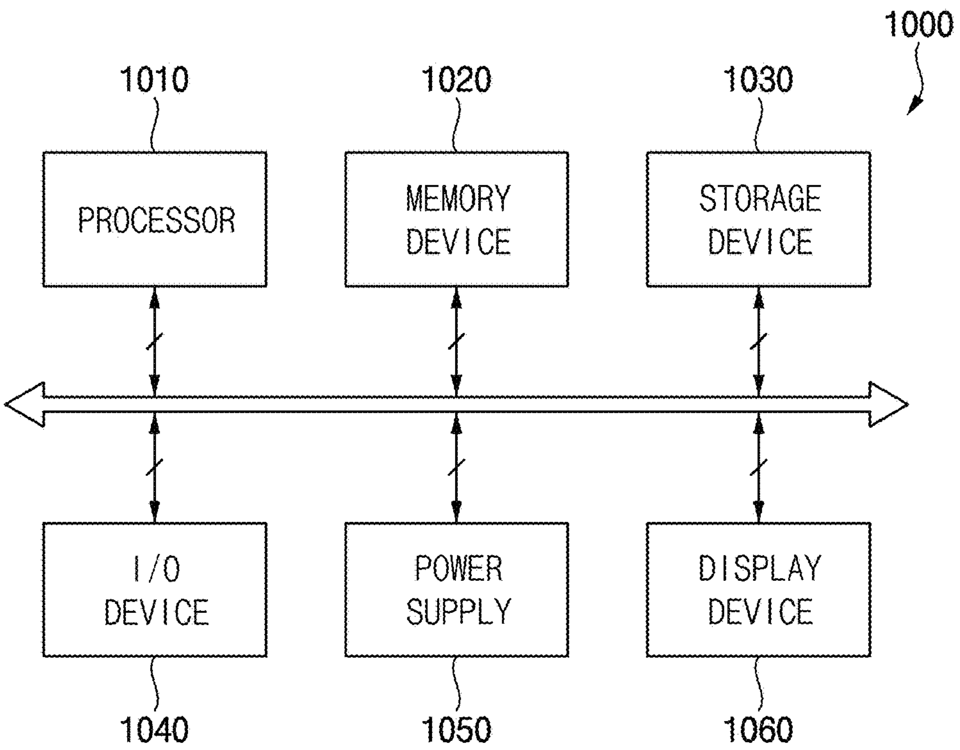
FIG. 28 is a block diagram illustrating an electronic device according to an embodiment of the present inventive concept.
Figure 29:
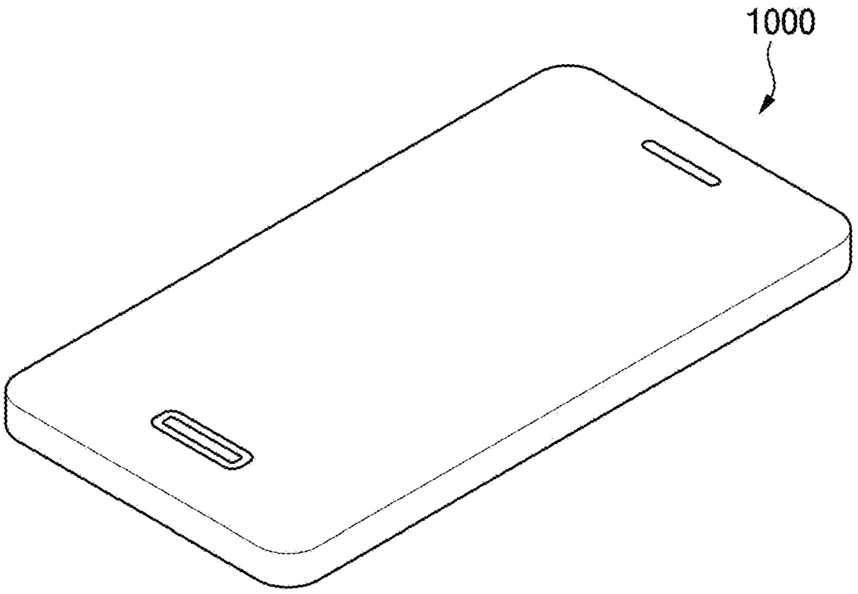
FIG. 29 is a view illustrating an example in which the electronic device of FIG. 28 is implemented as a smart phone.

FIG. 28 is a block diagram illustrating an electronic device according to an embodiment of the present inventive concept. FIG. 29 is a view illustrating an example in which the electronic device of FIG. 28 is implemented as a smart phone.

Referring to FIGS. 28 and 29, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to an embodiment, as shown in FIG. 28, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

The present disclosure enables high integration. Accordingly, the pixel circuit may be applicable to an ultra-high resolution display apparatus. Additionally, the display apparatus does not rely on an emission driver to operate, which may be advantageous for cost reduction and high-resolution design.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A pixel circuit comprising:

a first transistor including a control electrode connected to a second node, a first electrode configured to receive a first power supply voltage, and a second electrode connected to a third node;

a second transistor including a control electrode configured to receive a write signal, a first electrode connected to a data line, and a second electrode connected to a first node;

a third transistor including a control electrode configured to receive a compensation signal, a first electrode connected to the second node, and a second electrode connected to the third node;

a fourth transistor including a control electrode configured to receive an initialization signal, a first electrode configured to receive an initialization voltage, and a second electrode connected to a fourth node;

a fifth transistor including a control electrode connected to the first node, a first electrode connected to the third node, and a second electrode connected to the fourth node; and a light emit element including a first electrode connected to the fourth node, and a second electrode configured to receive a second power supply voltage.

2. The pixel circuit of claim 1, further comprising:

a first capacitor including a first electrode configured to receive the first power supply voltage and a second electrode connected to the second node;

a second capacitor including a first electrode connected to the first node and a second electrode connected to the second node; and a third capacitor including a first electrode connected to the control node of the fourth transistor and a second electrode connected to the second node.

3. The pixel circuit of claim 2, wherein a frame period of the pixel circuit comprises:

a first period in which the initialization signal is inactive, the compensation signal is inactive, and the write signal is active;

a second period in which the initialization signal changes from inactive to active, the compensation signal stays inactive, and the write signal is active;

a third period in which the initialization signal is active, the compensation signal is active, and the write signal is active;

a fourth period in which the initialization signal changes from active to inactive, the compensation signal is inactive, and the write signal is active; and a fifth period in which the initialization signal is inactive, the compensation signal is inactive, and the write signal is inactive.

4. The pixel circuit of claim 3, wherein in the first period, the second transistor is in a turned-on state in response to the write signal, a reference voltage of the data line is applied to the control node of the fifth transistor, and a voltage of the second node is initialized.

5. The pixel circuit of claim 3, wherein in the second period, the fourth transistor is in a turned-on state in response to the initialization signal, the initialization voltage is applied to the fourth node, the fifth transistor is in a turned-off state, and the first transistor is in a turned-on state in response to a coupling operation of the third capacitor.

6. The pixel circuit of claim 3, wherein in the third period, the third transistor is in a turned-on state in response to the compensation signal, and a threshold voltage of the first transistor is stored between the first electrode of the first capacitor and the second electrode of the first capacitor.

7. The pixel circuit of claim 3, wherein in the fourth period, the third transistor is in a turned-off state in response to an inactive state of the compensation signal, the second transistor transmits a data voltage of the data line to the first node in response to an active state of the write signal, and the data voltage of the first node is applied to the second node in response to a coupling operation of the second capacitor.

8. The pixel circuit of claim 3, wherein in the fifth period, the second transistor is in a turned-off state in response to the compensation signal, and the fifth transistor is turned on based on a voltage of the first node.

9. The pixel circuit of claim 2, wherein a frame period of the pixel circuit comprises:

a first period in which the initialization signal is inactive, the compensation signal is inactive, and the write signal is inactive;

a second period in which the initialization signal is active, the compensation signal is inactive, and the write signal is active;

a third period in which the initialization signal is active, the compensation signal is active, and the write signal is active;

a fourth period in which the initialization signal is inactive, the compensation signal is inactive, and the write signal is active; and a fifth period in which the initialization signal is inactive, the compensation signal is inactive, and the write signal is inactive.

10. The pixel circuit of claim 2, wherein a frame period of the pixel circuit comprises:

a first period in which the initialization signal is inactive, the compensation signal is inactive, and the write signal is active;

a second period in which the initialization signal changes from inactive to active, the compensation signal is inactive, and the write signal is active;

a third period in which the initialization signal is active, the compensation signal is inactive, and the write signal is inactive;

a fourth period in which the initialization signal is active, the compensation signal is active, and the write signal is inactive;

a fifth period in which the initialization signal changes from active to inactive, the compensation signal is inactive, and the write signal changes from inactive to active; and a sixth period in which the initialization signal is inactive, the compensation signal is inactive, and the write signal is inactive.

11. The pixel circuit of claim 1, wherein the initialization voltage is the second power supply voltage.

12. The pixel circuit of claim 1, further comprising:

a first capacitor including a first electrode configured to receive the first power supply voltage, and a second electrode connected to the second node;

a second capacitor including a first electrode connected to the first node, and a second electrode connected to the second node; and a third capacitor including a first electrode configured to receive the compensation signal, and a second electrode connected to the second node.

13. The pixel circuit of claim 1, further comprising:

a first capacitor including a first electrode configured to receive the first power supply voltage, and a second electrode connected to the second node;

a second capacitor including a first electrode connected to the first node, and a second electrode connected to the second node;

a third capacitor including a first electrode connected to the control electrode of the fourth transistor, and a second electrode connected to the second node;

a fourth capacitor including a first electrode connected to the control electrode of the third transistor, and a second electrode connected to the second node;

a fifth capacitor including a first electrode configured to receive the first power supply voltage, and a second electrode connected to the first node; and a sixth capacitor including a first electrode connected to the fourth node, and a second electrode connected to the control electrode of the second transistor, wherein the initialization signal is a next stage write signal of a next stage.

14. The pixel circuit of claim 13, wherein a frame period of the pixel circuit comprises:

a first period in which the write signal changes from inactive to active, the next stage write signal is inactive, and the compensation signal is inactive;

a second period in which the write signal is active, the next stage write signal is inactive, and the compensation signal is inactive;

a third period in which the write signal changes from active to inactive, the next stage write signal changes from inactive to active, and the compensation signal is inactive;

a fourth period in which the write signal changes from inactive to active, the next stage write signal changes from active to inactive, and the compensation signal changes from inactive to active;

a fifth period in which the write signal is active, the next stage write signal is inactive, and the compensation signal is active;

a sixth period in which the write signal is active, the next stage write signal changes from inactive to active, and the compensation signal changes from active to inactive;

a seventh period in which the write signal is active, the next stage write signal is active, and the compensation signal is inactive;

an eighth period in which the write signal changes from active to inactive, the next stage write signal is active, and the compensation signal is inactive;

a ninth period in which the write signal is inactive, the next stage write signal changes from active to inactive, and the compensation signal is inactive; and a tenth period in which the write signal, the next stage write signal is inactive, and the compensation signal are inactive.

15. The pixel circuit of claim 14, wherein in the ninth period, the third transistor is in a turned-off state in response to the compensation signal, a coupling voltage is applied to the second node in response to a coupling operation of the third capacitor, and a voltage of the second node has a final compensation voltage.

16. The pixel circuit of claim 14, wherein in the tenth period, a data voltage of the data line is applied to the control electrode of the fifth transistor, and the data voltage is lower than a sum of the first power supply voltage and a threshold voltage of the fifth transistor, and the fifth transistor is in a turned-on state.

17. The pixel circuit of claim 13, wherein a frame period of the pixel circuit comprises:

a first period in which the write signal changes from inactive to active, the next stage write signal is inactive, and the compensation signal is inactive;

a second period in which the write signal is active, the next stage write signal is inactive, and the compensation signal is inactive;

a third period in which the write signal changes from active to inactive, the next stage write signal changes from inactive to active, and the compensation signal is inactive;

a fourth period in which the write signal changes from inactive to active, the next stage write signal changes from active to inactive, and the compensation signal changes from inactive to active;

a fifth period in which the write signal is active, the next stage write signal is inactive, and the compensation signal is active;

a sixth period in which the write signal changes from active to inactive, the next stage write signal changes from inactive to active, and the compensation signal changes from active to inactive;

a seventh period in which the write signal is inactive, the next stage write signal changes from active to inactive, and the compensation signal is inactive; and an eighth period in which the write signal is inactive, the next stage write signal is inactive, and the compensation signal is inactive.

18. A display apparatus comprising:

a display panel including a pixel circuit;

a gate driver configured to output a write signal, a compensation signal and an initialization signal to the pixel circuit; and a data driver configured to output a data voltage or reference voltage to the pixel circuit, wherein the pixel circuit comprises:

a first transistor including a control electrode connected to a second node, a first electrode configured to receive a first power supply voltage, and a second electrode connected to a third node;

a second transistor including a control electrode configured to receive a write signal, a first electrode connected to a data line, and a second electrode connected to a first node;

a third transistor including a control electrode configured to receive a compensation signal, a first electrode connected to the second node, and a second electrode connected to the third node;

a fourth transistor including a control electrode configured to an receive an initialization signal, a first electrode configured to receive an initialization voltage, and a second electrode connected to a fourth node;

a fifth transistor including a control electrode connected to the first node, a first electrode connected to the third node, and a second electrode connected to the fourth node; and a light emit element including a first electrode connected to the fourth node, and a second electrode configured to receive a second power supply voltage.

19. The display apparatus of claim 18, wherein the pixel circuit further comprises:

a first capacitor including a first electrode configured to receive the first power supply voltage and a second electrode connected to the second node;

a second capacitor including a first electrode connected to the first node and a second electrode connected to the second node; and a third capacitor including a first electrode connected to the control node of the fourth transistor and a second electrode connected to the second node.

20. The display apparatus of claim 18, wherein a frame period of the pixel circuit comprises:

a first period in which the initialization signal is inactive, the compensation signal is inactive, and the write signal is active;

a second period in which the initialization signal changes from inactive to active, the compensation signal is inactive, and the write signal is active;

a third period in which the initialization signal is active, the compensation signal is active, and the write signal is active;

a fourth period in which the initialization signal changes from active to inactive, the compensation signal is inactive, and the write signal is active; and a fifth period in which the initialization signal is inactive, the compensation signal is inactive, and the write signal is inactive.

* * * * *